United States Patent [19]
Nishimura et al.

[11] Patent Number: 6,152,105
[45] Date of Patent: Nov. 28, 2000

[54] IDLE SPEED CONTROL DEVICE FOR ENGINE

[75] Inventors: Eiji Nishimura, Hiroshima; Takahisa Ishihara; Kouji Miyamoto, both of Higashihiroshima, all of Japan

[73] Assignee: Mazda Motor Corporation, Hiroshima-ken, Japan

[21] Appl. No.: 09/257,933

[22] Filed: Feb. 26, 1999

[30] Foreign Application Priority Data

Mar. 31, 1998 [JP] Japan .................................. 10-087376

[51] Int. Cl.[7] ....................................................... F02P 5/15
[52] U.S. Cl. ................................ 123/339.11; 123/339.12; 123/436; 123/406.33; 701/111
[58] Field of Search .......................... 123/339.11, 339.14, 123/406.33, 406.5, 406, 55, 339.12, 339.24, 436; 701/111

[56] References Cited

U.S. PATENT DOCUMENTS

| | | | |
|---|---|---|---|
| 4,844,027 | 7/1989 | Nakamura | 123/406.33 |
| 5,000,149 | 3/1991 | Miyama | 123/406.33 |
| 5,000,150 | 3/1991 | Miyama et al. | 123/406.33 |
| 5,035,219 | 7/1991 | Ohkumo et al. | 123/406.33 |
| 5,038,736 | 8/1991 | Ohkumo et al. | 123/406.33 |
| 5,081,973 | 1/1992 | Minamitani | 123/339.11 |
| 5,483,946 | 1/1996 | Hamburg et al. | 123/339.24 |
| 5,492,094 | 2/1996 | Cullen et al. | 123/339.11 |
| 5,497,745 | 3/1996 | Cullen et al. | 123/339.11 |
| 5,755,205 | 5/1998 | Nishimura et al. | 123/406.24 |

FOREIGN PATENT DOCUMENTS

| | | |
|---|---|---|
| 0947682 | 10/1999 | European Pat. Off. . |
| 7-92037 | 10/1995 | Japan . |
| 8-218995 | 8/1996 | Japan . |

*Primary Examiner*—Henry C. Yuen
*Assistant Examiner*—Hieu T. Vo
*Attorney, Agent, or Firm*—Nixon Peabody LLP; Donald R. Studebaker

[57] ABSTRACT

An engine control device has an idle speed control of an engine by an ignition timing control and an idle speed control by air-by-fuel ratio feedback. This engine control device detects roughness caused by a torque change on the basis of a change in angular velocity of a crank shaft, sets a control gain depending on the roughness, reflects the control gain on the idle speed control by the ignition timing control, thereby harmonizing the idle speed control of the engine by the ignition timing control with the idle speed control by the air-by-fuel ratio feedback.

23 Claims, 22 Drawing Sheets

DETERMINATION OF θrgh

DETERMINATION OF λrgh

IDLE SPEED CONTROL DEVICE FOR ENGINE

BACKGROUND OF THE INVENTION

Field of the Invention

The present invention relates to an idle speed control device for engine in which an idle speed is feedback-controlled such that an engine speed is equal to a target idle speed in idling, warming up of an engine or an increase in temperature of an exhaust gas purification catalyzer is promoted by largely retarding an ignition timing in cold starting, and a roughness control for stabilizing a change in torque caused by retarding the ignition timing is performed.

In general, in an automobile engine, an ignition timing, an air-by-fuel ratio, and the like are changed such that an engine speed is equal to a target idle speed in idling, so that the idle speed is feedback-controlled (for example, see Japanese Examined Patent Publication No. 7-92037). Here, the target idle speed is set to be an appropriate value according to drive conditions (for example, a water temperature of the engine, an operation of an air conditioner, and the like) to prevent engine stop from occurring and to prevent a fuel from being unnecessarily consumed. In the engine disclosed in Japanese Examined Patent Publication No. 7-92037, an idle speed is feedback-controlled by changing an ignition timing, and the feedback control variable of the ignition timing is adjusted depending on an intake air filling variable.

On the other hand, in an automobile engine, in order to purify an exhaust gas, a catalytic converter having an exhaust gas purification catalyzer is arranged on an exhaust passage. As the exhaust gas purification catalyzer, a conventional catalytic converter rhodium for simultaneously purifying HC, CO, and NOx is popularly used. The catalytic converter rhodium has the following characteristic features. That is, catalytic activity at a low temperature is relatively low, and exhaust gas purification performance cannot be sufficiently achieved. Therefore, in a catalytic converter using a catalytic converter rhodium as an exhaust gas purification catalyzer, when the engine is started in a cold state (in cold starting), an exhaust gas temperature is rapidly increased after the engine is started, so that an increase in temperature (activation) of the exhaust gas purification catalyzer must be promoted. A countermeasure in which an electric heater for heating the exhaust gas purification catalyzer is arranged to promote the increase in temperature of the exhaust gas purification catalyzer may be used. In this manner, an increase in cost and an increase in power consumption may disadvantageously occur.

In a general automobile, when an engine is started in a cold state, in view of that fuel consumption performance is improved, the engine is preferably started after the engine temperature (water temperature of the engine) becomes high to some extent. Therefore, in the automobile engine, the engine temperature must be rapidly increased.

For this reason, an engine system in which an increase in engine temperature or exhaust gas temperature is promoted by largely retarding an ignition timing in cold starting of the engine is provided (for example, see Japanese Unexamined Patent Publication No. 8-218995). More specifically, when the ignition timing is largely retarded as described above, the rate of changing from heat energy generated by ignition and combustion of a fuel-air mixture in a combustion chamber decreases, so that heat energy transmitted to engine cooling water or an exhaust gas increases. Warming up of the engine is promoted, not only an increase in temperature of the exhaust gas but also an increase in temperature of the exhaust gas purification catalyzer are promoted.

However, when the ignition timing is largely retarded to warm up the engine or promote an increase in temperature of the exhaust gas purification catalyzer, an output torque of the engine decreases, and combustion performance becomes unstable. For this reason, in a low output state (small-load and low-speed state), for example, a change in torque (roughness) increase in idling, and smooth driving of the engine is degraded. Therefore, as in an engine system disclosed in, e.g., Japanese Unexamined Patent Publication No. 8-218995, in an engine system in which an ignition timing is largely retarded to rapidly increase an engine temperature or an exhaust gas temperature, a roughness control for controlling an output torque of the engine is performed such that a change in torque ranges within an allowable limit in a predetermined low-output region.

For example, in an engine in which an idle speed is feedback-controlled such that the torque is changed by changing an ignition timing, the ignition timing is largely retarded in cold starting, and the ignition timing is corrected to stabilize a change in torque caused by the retarded angle so as to perform a roughness control, since the feedback control of the idle speed and the roughness control have the ignition timing as control variables, both the feedback control and the roughness control must be harmonized with each other, or integrally recognized to make them efficient, disadvantageously.

The harmonization and integration of the two controls must be also performed when the feedback control of an idle speed and the roughness control are performed such that an air-by-fuel ratio as a control variable.

SUMMARY OF THE INVENTION

The present invention has been made to solve the conventional problem, and as its object to provide a means which can harmonize a feedback control of an idle speed and a roughness control for an engine which performs a feedback control of an idle speed and roughness control for largely retarding an ignition timing in cold starting and stabilizing a change in torque caused by the retarded angle, and can improve the control accuracies of both the controls.

The present invention which has been made to solve the above problem provides an idle speed control device for engine comprising: (a) ignition timing control means for changing an ignition timing to feedback-control an idle speed such that an engine speed is equal to a target idle speed in idling; and (b) roughness control means for correcting the ignition timing depending on a torque change state variable such that a torque change state caused by combustion ranges within an allowable limit, (c) characterized in that the idle speed control means changes a feedback control variable in the feedback control of the idle speed by a roughness control variable of the roughness control means.

In this case, when the basic ignition timing of the engine is set to be offset on a retarded angle side from an ignition timing (MBT) at which a maximum torque can be obtained, the ignition timing control means preferably change a feedback control variable by a method in which a control gain in the feedback control of the idle speed is decreased as the roughness control variable of the roughness control means is on the retarded angle side.

The engine is preferably designed such that the ignition timing is corrected depending on an engine temperature (water temperature of the engine).

In general, in the engine, if the other conditions than the ignition timing are not changed, an output torque is maximum when the ignition timing is set to be the MBT, and the output torque decreases as the ignition timing is retarded from the MBT. A variation rate of the output torque to an amount of retarded angle of the ignition timing is not constant, and the variation rate increases as the ignition timing is on the retarded angle side (see FIG. 6 and FIG. 9). For this reason, when the feedback control of the idle speed is performed by using the ignition timing as a control variable, a change variable of the output torque to a change in ignition timing as the ignition timing is on the retarded angle side. Therefore, when the feedback control variable or the control gain in the feedback control of the idle speed is made constant, the output torque largely changes depending on the degree of a retarded angle of an ignition timing, and the control accuracy is degraded. In the feedback control of the idle speed by using the ignition timing as a control variable, a feedback control variable or a control gain is preferably set depending on the degree of the retarded angle of the ignition timing, and the control accuracy is preferably improved.

In the idle speed control device for engine, a roughness control variable, i.e., an ignition timing is changed by the roughness control depending on a torque change state (roughness). On the other hand, the feedback control variable (ignition timing) in the feedback control of the idle speed is preferably changed depending on the roughness control variable, i.e., the degree of a retarded angle of the ignition timing. For example, as the roughness control variable (ignition timing) is on the retarded angle side, a control gain in the feedback control of the idle speed is set to be small. For this reason, the output torque to the feedback control variable is stabilized or made constant, and the control accuracy of the feedback control of the idle speed is improved. More specifically, the feedback control of the idle speed and the roughness control can be harmonized, and the control accuracies of both the controls can be improved.

Therefore, in cold starting, the idle speed can follow a target idle speed at a high accuracy, warming up of the engine or an increase in temperature of an exhaust gas purification catalyzer can be promoted while a change in torque (roughness) is set within an allowable range. For this reason, fuel consumption performance and emission performance can be considerably improved.

In the idle speed control device for engine, when the feedback control of the idle speed and the roughness control do not use the ignition timing but an air-by-fuel ratio as a control variable, an A/F control means preferably changes a feedback control variable in the feedback control of an idle speed depending on the roughness control variable of the roughness control means. In this case, the A/F control means preferably changes the feedback control variable by such a method that a control gain in the feedback control of the idle speed is decreased as the roughness control variable (air-by-fuel ratio) of the roughness control means is lean.

In general, in an engine, if the other conditions than the air-by-fuel ratio are not changed, an output torque is maximum when the air-by-fuel ratio is slightly on a rich side (about A/F=13) with respect to a theoretical air-by-fuel ratio (A/F 14.7), and the output torque decreases as the air-by-fuel ratio is lean with respect to the theoretical air-by-fuel ratio. A variation rate of the output torque to an air-by-fuel ratio is not constant, and the variation rate increases as the air-by-fuel ratio is lean (see FIG. 11). For this reason, when the feedback control of the idle speed is performed by using the air-by-fuel ratio as a control variable, a change variable of the output torque to a change in air-by-fuel ratio as the air-by-fuel ratio is lean. Therefore, when the feedback control variable or the control gain in the feedback control of the idle speed is made constant, the output torque largely changes depending on the air-by-fuel ratio, and the control accuracy is degraded. In the feedback control of the idle speed by using the air-by-fuel ratio as a control variable, a feedback control variable or a control gain is preferably set depending on the air-by-fuel ratio, and the control accuracy is preferably improved.

In the idle speed control device using the air-by-fuel ratio as a control variable, a roughness control variable, i.e., an air-by-fuel ratio is changed by the roughness control depending on a torque change state (roughness). On the other hand, the feedback control variable (air-by-fuel ratio) in the feedback control of the idle speed is preferably changed depending on the roughness control variable, i.e., the air-by-fuel ratio. For example, as the roughness control variable (air-by-fuel ratio) is lean, a control gain in the feedback control of the idle speed is set to be small. For this reason, the output torque to the feedback control variable is stabilized or made constant, and the control accuracy of the feedback control of the idle speed is improved. More specifically, as in the case using the ignition timing as a control variable, the feedback control of the idle speed and the roughness control can be harmonized, and the control accuracies of both the controls can be improved.

The idle speed control device for engine is especially preferably applied to an engine in which a catalytic converter having an exhaust gas purification catalyzer is arranged on an exhaust passage. In this case, when the engine is started in a cold state, an increase in exhaust gas purification catalyzer can be promoted, and emission performance can be improved.

Although the present invention is especially effected to an engine for performing roughness control, the present invention is naturally effected to an engine which retards an ignition timing depending on, e.g., a water temperature of the engine, but does not perform roughness control, as a matter of course.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE INVENTION

Preferred embodiments obtained by applying the present invention to an automobile having a gasoline engine will be described in detail in accordance with the accompanying drawings.

<System Arrangement>

Figure 1:
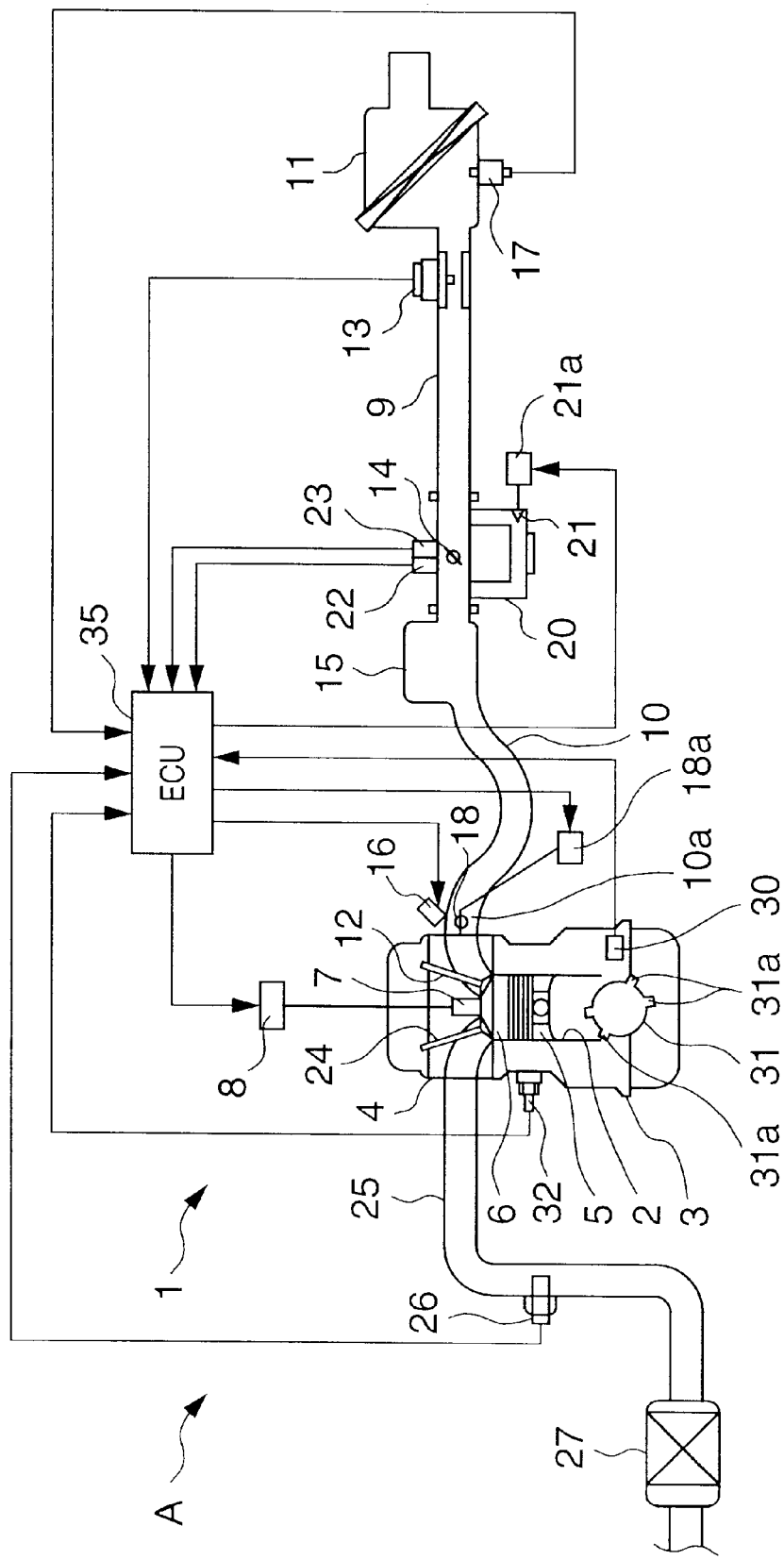
FIG. 1 is a diagram of the entire arrangement of an engine system having a control device according to the present invention.

As shown in FIG. 1, in an engine system A for automobile comprising an idle speed control device according to the present invention, a straight four-cycle four-cycle engine 1 using gasoline as a fuel is arranged. In this engine 1, although not shown in detail, a cylinder block 3 having four cylinders (only one is shown) and a cylinder head 4 formed on the upper surface of the cylinder block 3. A piston 5 is fitted in each cylinder 2 such that the piston 5 can be reciprocated, and a combustion chamber 6 is partitioned by the piston 5 and the cylinder head 4. Ignition plugs 7 are arranged on the ceiling portions of the combustion chambers 6 to face the combustion chamber 6, respectively, and the ignition plug 7 are connected to an ignition circuit 8 including an igniter or the like which can be electrically controlled in ignition timing.

In addition, in the engine system A, in order to supply an air (intake air) to the combustion chamber 6 of each cylinder 2, a single common intake path 9 for taking in atmospheric air and an independent intake path 10, arranged every cylinder, for receiving the air from the common intake path 9 are arranged. Here, the upstream end of the common intake path 9 is connected to an air cleaner 11 for removing dust in the air, and the downstream end is connected to a surge tank 15 for stabilizing the flow of the air. The upstream ends of the independent intake path 10 are connected to the surge tank 15, and the downstream ends communicate with the combustion chambers 6 through intake valves 12, respectively.

In the common intake path 9, a hot wire type air-flow sensor 13 for detecting a flow rate of the air (intake air flow which is actually taken in the engine 1) and a throttle valve 14 opened/closed depending on a stepping-on measurement of an acceleration pedal (not shown) to close the common intake path 9 are sequentially arranged from the upstream side in the flow direction of the air (left direction in the positional relationship in FIG. 1). In each independent intake path 10, an injector 16 (fuel injection valve) which receives a fuel injection signal (injection pulse) from an ECU 35 (engine control unit) (to be described later) to inject a fuel is arranged. An intake air temperature sensor 17 for detection an intake air temperature (temperature of the air) is attached to the air cleaner 11.

Each independent intake path 10 is branched into a first intake path (not shown) and a second intake path 10a (intake port) near the downstream end of the independent intake path 10, and a switching valve 18 (intake air flow strengthening control valve) opening/closing-controlled by an actuator 18a is arranged on the upstream side of the branch portion of both the first and second intake paths and the immediately upstream side of the injector 16. Here, the switching valve 18 on an upper end side in an open state such that a gap portion for causing an intake air to flow on the injector 16 side in a closed state is formed. When the switching valve 18 is closed, the air is substantially supplied from the notched portion to the combustion chamber 6. At this time, a strong tumble is generated in the combustion chamber 6, and the combustion performance of a fuel-air mixture are improved.

The portions of the common intake path 9 on the upstream side and the downstream side from the throttle valve 14 are connected to each other by an ISC (Idle Speed Control) bypass 20, and an ISC valve 21 which is opening/closing-controlled by an actuator 21a to open/close the ISC bypass 20 is arranged on the ISC bypass 20. The opening angle of the ISC valve 21 is controlled, so that the idle speed of the engine 1 is adjusted. Near the throttle valve 14, an idle switch 22 for detecting a full-open state of the throttle valve 14 and a throttle opening angle sensor 23 for detecting an opening angle (throttle opening angle) of the throttle valve 14 are arranged on the common intake path 9.

In the engine system A, an exhaust passage 25 for exhausting an exhaust gas of the engine 1 to the atmosphere is arranged, and the exhaust passage 25 is branched into four paths near the upstream end when viewed in the flow direction of an exhaust gas (left direction in the positional relationship in FIG. 1), and the upstream ends (exhaust ports) of the four paths communicate with the corresponding combustion chambers 6 through exhaust valves 24, respectively. In the exhaust passage 25, an oxygen sensor 26 (e.g., a λ oxygen sensor, a linear oxygen sensor, or the like) for detecting an oxygen concentration (i.e., an air-by-fuel ratio) in the exhaust gas and a catalytic converter 27 for purifying the exhaust gas are sequentially arranged from the upstream side when viewed in the flow direction of the exhaust gas. The oxygen sensor 26 is designed to detect an air-by-fuel ratio in the combustion chamber 6 on the basis of the oxygen concentration in the exhaust gas. The λ oxygen sensor is an oxygen sensor using a form in which an output sharply changes near the theoretical air-by-fuel ratio ($\lambda=1$) to detect whether the air-by-fuel ratio is substantially higher or lower than the theoretical air-by-fuel ratio. Although the linear oxygen sensor is basically an oxygen sensor using a form in which an oxygen gas concentration can be linearly detected, the detection accuracy of the oxygen gas concentration near the theoretical air-by-fuel ratio is improved (i.e., an output change with respect to a change in oxygen gas concentration is large). The catalytic converter 27 uses, as an exhaust gas purification catalyzer, a catalytic converter rhodium which can simultaneously purify hydrocarbon (HC), carbon monoxide (CO), and nitrogen oxides (NOx) in the exhaust gas and has a function of purifying NOx even in a lean state.

In the engine 1, a crank angle sensor 30 constituted by an electromagnetic pickup or the like. The crank angle sensor 30 is arranged at a position corresponding to the external periphery of a detected plate 31 attached to the end portion of a crank shaft (not shown). When the detected plate 31 is rotated with rotation of the crank shaft, the crank angle sensor 30 outputs a pulse signal with passing of four projections 31a formed on the external periphery. In addition, a water temperature sensor 32 for detecting a temperature (water temperature of the engine) of cooling water in a water jacket is arranged in the engine 1.

The ECU 35 (engine control unit) constituted by a microcomputer or the like is arranged to perform various controls of the engine system A or the engine 1.

Figure 2:
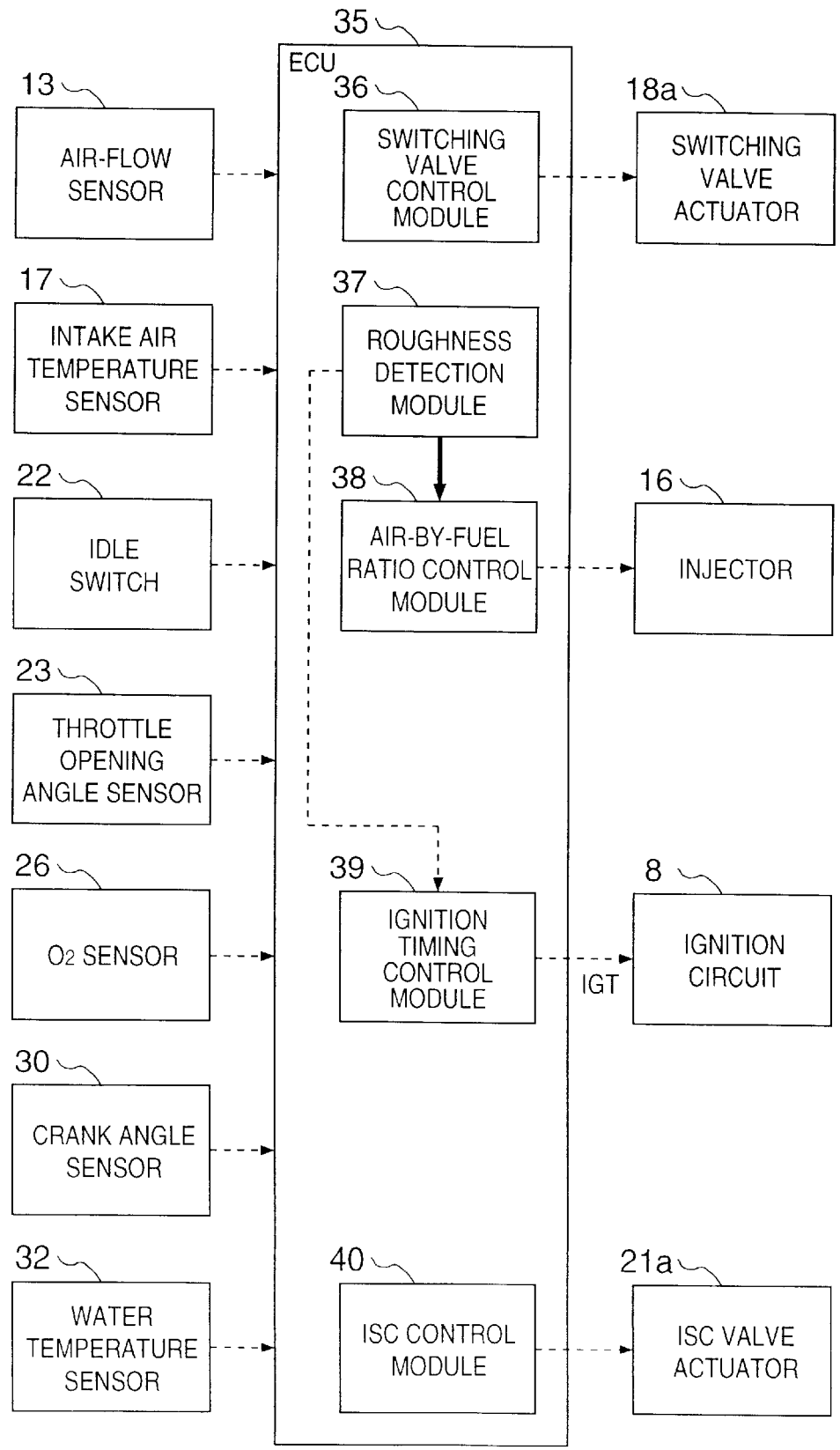
FIG. 2 is a block diagram of an ECU arranged in the engine system shown in FIG. 1.

As also shown in FIG. 2, the ECU 35 is designed to receive output signals output from the air-flow sensor 13, the intake air temperature sensor 17, the idle switch 22, the throttle opening angle sensor 23, the oxygen sensor 26, the crank angle sensor 30, the water temperature sensor 32, and the like. On the other hand, the ECU 35 is designed to output a signal (pulse signal) for controlling fuel injection to the injector 16, output a signal for controlling an ignition timing to the ignition circuit 8, and also output control signals to the actuator 21a of the ISC valve 21 and the actuator 18a of the switching valve 18.

More specifically, in the ECU 35, a switching valve control module 36 for controlling the actuator 18a of the switching valve 18, a roughness detection module 37 for detecting a change state of a crank angle velocity of the engine 1 or a torque change state (to be referred to as "roughness" or a "roughness value" hereinafter), an air-by-fuel ratio control module 38 for controlling an amount of fuel injection, i.e., an air-by-fuel ratio of the injector 16, and an ISC control module 40 for controlling an ignition timing control module 39 for controlling an ignition timing of an ignition circuit 8 (ignition plug 7) and feedback-controlling an idle speed and the actuator 21a of the ISC valve 21.

<Outlines of Controls>

Outlines of various controls of the engine system A or the engine 1 executed by the ECU 35 will be described below.

More specifically, when an engine drive state is set in a predetermined low-output region (region with a low load and a low rotation speed), the switching valve control module 36 causes the actuator 18a arranged on each cylinder 2 to almost close the switching valve 18, and an air is substantially supplied from only the notched portion of the switching valve 18 into the combustion chamber 6.

Figure 3:
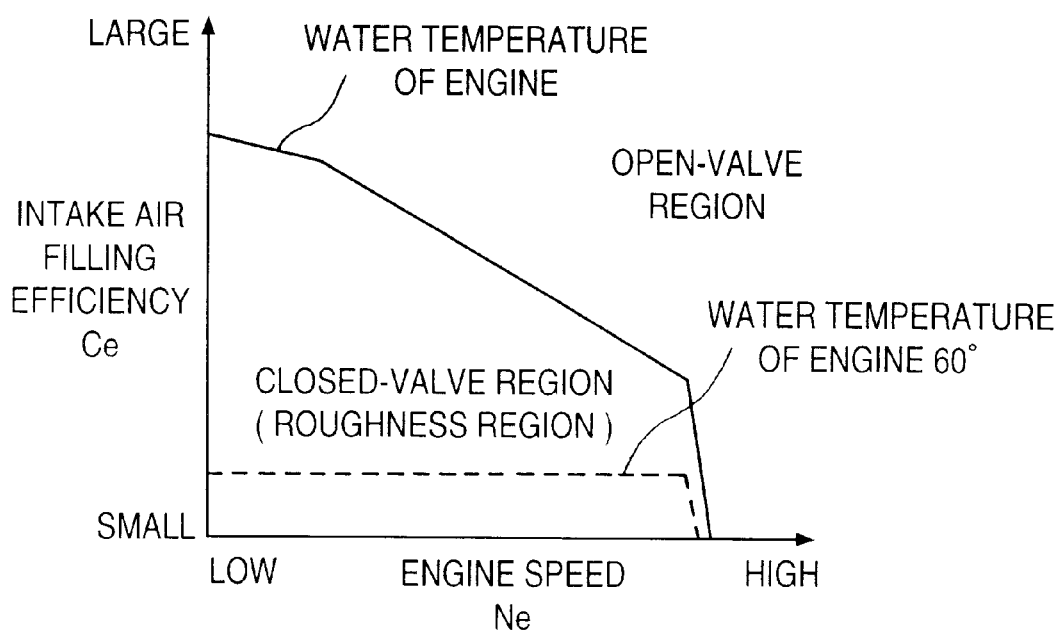
FIG. 3 is a graph showing an open-valve region and a closed-valve region of a switching valve by using an engine speed, an intake air filling efficiency, and a water temperature of an engine as parameters.

For example, as shown in FIG. 3, a region (closed-valve region) in which the switching valve 18 is closed is set depending on an engine speed, an intake air filling efficiency (engine load), and a temperature of the engine. This closed-valve region is set by searching a map having the engine speed (abscissa), the intake air filling efficiency (ordinate), and the water temperature of the engine as parameters.

In the closed-valve region, a strong tumble is formed in the combustion chamber 6 to strengthen an intake air flow, thereby considerably improving the combustion performance of a fuel-air mixture. At this time, gasification and spraying of a fuel injected from the injector 16 are promoted by a high-speed air flowing into the combustion chamber 6 through the notched portion of the switching valve 18, thereby improving the combustion performance of the fuel-air mixture.

On the other hand, when the drive state of the engine 1 is set in the predetermined low-output region, the switching valve 18 is opened, a sufficient amount of air is supplied into the combustion chamber 6, and not only an intake air filling efficiency but also an engine output are increased.

The roughness detection module 37, as will be described later, detects a roughness value of the engine 1 to output the roughness value to the air-by-fuel ratio control module 38 and the ignition timing control module 39. The air-by-fuel ratio control module 38 and the ignition timing control module 39 perform a general air-by-fuel ratio control and a general ignition timing control and performs a roughness control (see FIG. 13 to FIG. 18) described later.

The air-by-fuel ratio control module 38 basically controls an amount of fuel injection of the injector 16 on the basis of an amount of intake air detected by the air-flow sensor 13 such that an air-by-fuel ratio of a fuel-air mixture supplied from each combustion chamber 6 is equal to a predetermined target air-by-fuel ratio (e.g., $\lambda=1$ and A/F=14.7). In the predetermined drive region, a feedback control of an air-by-fuel ratio is performed on the basis of a difference between an oxygen gas concentration, i.e., an actual air-by-fuel ratio, in an exhaust gas detected by the oxygen sensor 26 and a target air-by-fuel ratio. As will be described later, the air-by-fuel ratio control module 38 properly changes (corrects) an air-by-fuel ratio (basic value) in cold starting of the engine 1, so that the roughness control of the air-by-fuel ratio is performed.

The ignition timing control module 39 basically operates an ignition timing IGT(n) of a cylinder number n by the following equation (1) and renders the ignition plug 7 of the cylinder number n conductive at the timing of the ignition timing IGT(n) to perform ignition and combustion a fuel-air mixture in the combustion chamber 6. It is assumed that the ignition timing IGT(n) is defined to be set on an advanced angle side when the ignition timing IGT(n) is larger than a predetermined. In this case, the ignition timing IGT(n) is expressed as follows:

$$IGT(n) = \theta_{BASE} + \theta_{IDFB} + \theta_{RTD} + \theta_{rgh}(n) \quad (1)$$

In Equation (1), reference symbol n denotes one of integers of 1 to 4, and corresponds to one of the cylinder numbers in ignition order of the four cylinders of the engine 1. For example, when n=1 corresponds to the first cylinder, n=2 corresponds to the third cylinder, n=3 corresponds to the fourth cylinder, and n=4 corresponds to the second cylinder. Reference symbol $\theta_{BASE}$ denotes a basic ignition timing, i.e., a basic set value of the ignition timing; $\theta_{IDFB}$, a feedback control variable of an ignition timing for performing a feedback control such that an engine speed traces a target idle speed in idling; $\theta_{RTD}$, a control variable used to retard the ignition timing to increase the water temperature of the engine; and $\theta_{rgh}(n)$ (in case of Equation 1), a control variable for performing a roughness control by an ignition timing control.

In Equation (1), every cylinder, the basic ignition timing $\theta_{BASE}$ is generally set to be slightly closer to the value on a retarded angle side rather than an MBT, i.e., an ignition timing (e.g., 10° before a top death center) at which the engine 1 outputs the maximum torque. Actually, the basic ignition timing $\theta_{BASE}$ is set by using a basic ignition timing setting map (not shown) according to an engine speed and an intake air filling efficiency. The basic ignition timing $\theta_{BASE}$, as will be described later, is independently set to be suitable for drive conditions in an idle state and a non-idle state (off-idle state).

In Equation (1), reference symbol $\theta_{IDFB}$ denotes a feedback control variable (i.e., correction variable) of an ignition timing for performing a feedback control such that an engine speed $N_E$ (i.e., idle speed) traces a target idle speed $N_{TID}$ in idling.

Figure 4:
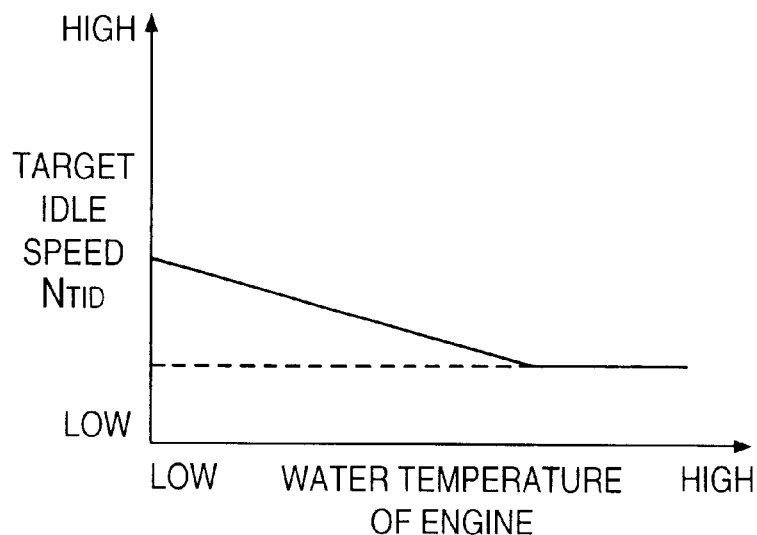
FIG. 4 is a graph showing a change characteristic of a target idle speed in cold starting as a function a water temperature of the engine.

For example, the target idle speed $N_{TID}$ is set depending on a water temperature of the engine (engine temperature), and, as shown in FIG. 4, is set with such a characteristic that the target idle speed $N_{TID}$ linearly decreases with an increase in water temperature of the engine. When the engine 1 is set in a warming-up state, e.g., the water temperature of the engine exceeds 60° C., the target idle is set to be a predetermined value falling within a range of, e.g., 650 to 700 rpm.

Figure 5:
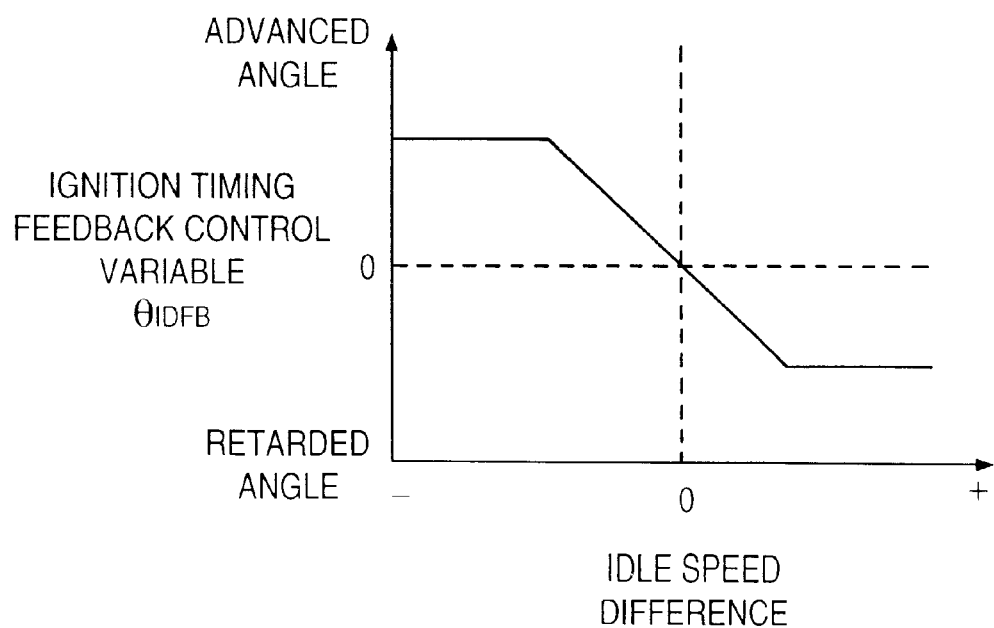
FIG. 5 is a graph showing a change characteristic of a feedback control variable of an ignition timing as a function of an idle speed difference.

For example, as shown in FIG. 5, basically, the feedback control variable $\theta_{IDFB}$ is preferably set depending on a difference (abscissa in FIG. 5) of the engine speed (idle speed) in idling with respect to the target idle speed $N_{TID}$ (note that, as will be described later, a control gain for determining $\theta_{IDFB}$ changes depending on an amount of retarded angle of the ignition timing). As is apparent from FIG. 5, for example, when the idle speed is higher than the target idle speed $N_{TID}$ (difference is plus), $\theta_{IDFB}$ is changed in a retarded angle direction, the output torque of the engine 1 decreases, and the idle speed decreases to be close to the target idle speed $N_{TID}$. On the other hand, when the idle speed is lower than the target idle speed $N_{TID}$ (difference is minus), $\theta_{IDFB}$ is changed in an advanced angle direction. In this manner, the output torque of the engine 1 increases, and the idle speed increases to be closed to the target idle speed $N_{TID}$.

Figure 6:
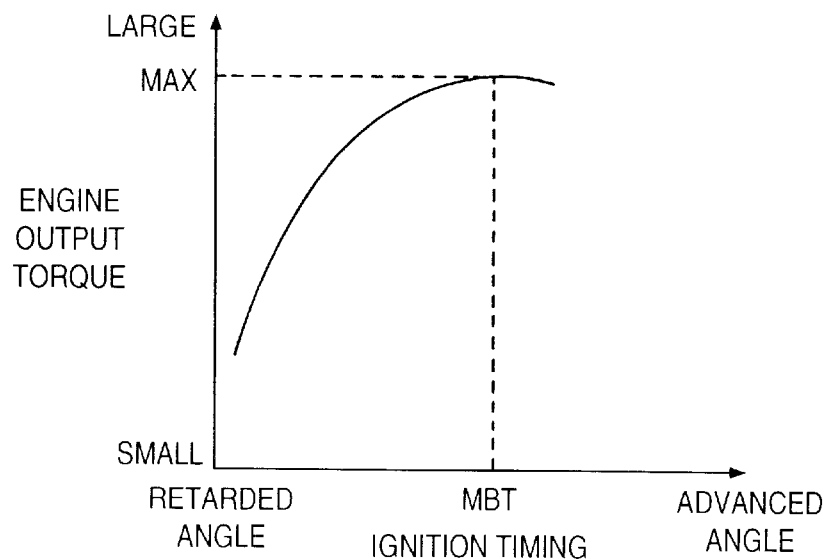
FIG. 6 is a graph showing dependency of an output torque of the engine as a function of an ignition timing.

For example, as shown in FIG. 6, on the retarded angle side with respect to an MBT (ignition timing at which an output torque is maximum), the output torque of the engine 1 as the ignition timing is retarded. For this reason, when the ignition timing is advanced or retarded as described above, the idle speed can be controlled.

However, since a roughness control is performed by using an ignition timing as a control variable in the engine system A or the engine 1, the ignition timing is changed by the roughness control. As will be described above, when a control gain of the feedback control of the idle speed is changed depending on the degree of a retarded angle of the ignition timing by the roughness control, the feedback control of the idle speed and the roughness control are harmonized, and the control accuracy of the feedback control is improved.

In Equation (1), $\theta_{RTD}$ denotes a control variable for promoting an increase in water temperature of the engine. When the engine system A or the engine 1 is started in a cold state, i.e., in cold starting, the ignition timing is largely retarded (e.g., about 15° CA), so that transmissibility of heat energy generated by combustion of a fuel-air mixture to engine cooling water or an exhaust gas is increased to promote warming up of the engine 1. An increase in exhaust gas temperature is promoted to promote an increase in temperature of a catalytic converter rhodium. More specifically, $\theta_{RTD}$ denotes a control variable for retarding the ignition timing to increase the water temperature. $\theta_{RTD}$ is called a "temperature increase promotion control variable" hereinafter.

Figure 7:
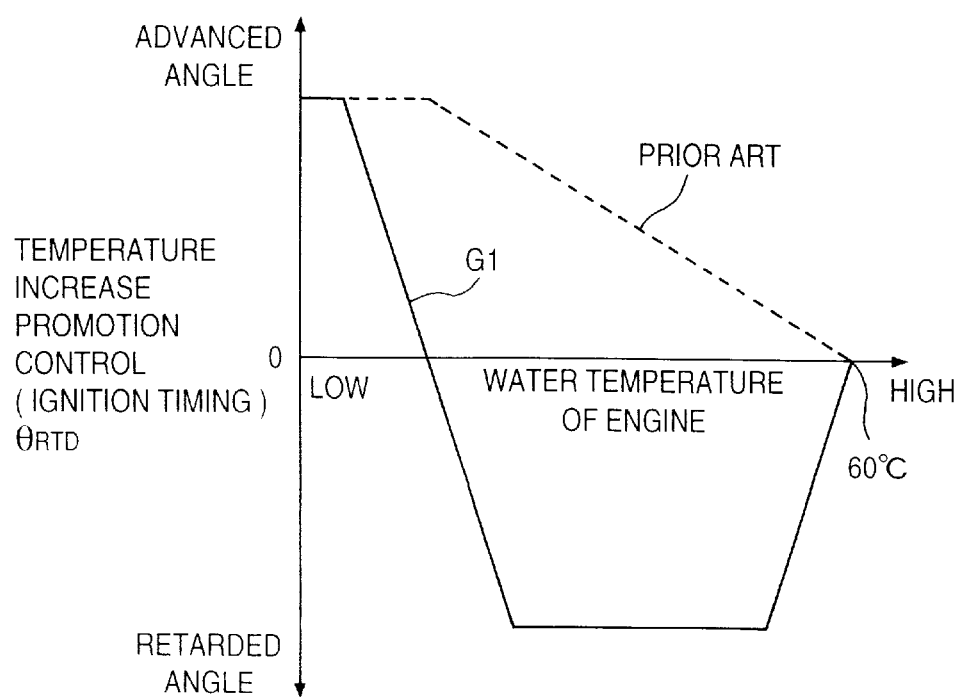
FIG. 7 is a graph showing a change characteristic of an increase temperature promoting control variable of the ignition timing as a function of a water temperature of the engine.

For example, as shown by a graph $G_1$ in FIG. 7, the temperature increase promotion control variable $\theta_{RTD}$ is largely set on a retarded angle side depending on the water temperature of the engine in other cases than a case that the water temperature of the engine is very low, so that warming up of the engine 1 or an increase in temperature of the catalytic converter rhodium in the catalytic converter 27 is promoted. In this manner, the emission performance and the fuel consumption performance of the engine system A or the engine 1 are improved.

However, when the ignition timing is largely retarded as described above to promote warming up of the engine 1 or an increase in temperature of the catalytic converter rhodium in the catalytic converter 27, an output torque of the engine 1 is relatively low. For this reason, due to the nature of a fuel (heavy fuel or light fuel), a change in combustion state of a fuel-air mixture in the combustion chamber 6, or the like, a change in crank angle velocity or a change in torque (roughness) occurs, and smooth driving of the engine 1 may be degraded. Therefore, a basic ignition timing (basic value) calculated by:

$$\theta_{BASE} + \theta_{IDFB} + \theta_{RTD}$$

is corrected by an IG roughness control variable $\theta_{rgh}(n)$ as expressed by Equation (1) to suppress roughness. The control variable $\theta_{rgh}(n)$ is set by a roughness control routine (to be described later) (FIG. 13 to FIG. 18).

In this manner, the ignition timing control module 39 checks on the basis of a signal input from the crank angle sensor 30 whether an ignition timing IGT(n) is set. When this ignition timing, the ignition circuit 8 renders the ignition plug 7 conductive to perform ignition and combustion of a fuel-air mixture every cylinder.

The ISC control module 40 controls the flow rate of bypass air flowing in the ISC bypass 20 by using a well-known general ISC control method.

In the engine system A or the engine 1, the ignition timing is largely retarded as described above, so that warming up of the engine 1 or the increase in temperature of the catalytic converter rhodium in the catalytic converter 27 are promoted. For this reason, a change in crank angle velocity or a change in torque (roughness) easily occurs in a low-output region, and the rotation stability of the engine may be degraded. Therefore, in an idle region or a predetermined low-output region (roughness control region), an ignition timing or an air-by-fuel ratio is corrected, so that a roughness control for improving the rotation stability of the engine is performed.

However, since the roughness control and the feedback control of the idle speed use the ignition timing as a control variable, both the controls are harmonized with each other and integrally recognized to improve control efficiency, and the control accuracies of both the controls must be improved. In the engine system A, a control gain in the feedback control of the idle speed is decreased as the roughness control variable (ignition timing) is on the retarded angle side, and a change in output torque with respect to a change in feedback control variable is made constant. In this manner, the stability or accuracy of the feedback control of the idle speed is improved.

Figure 8:
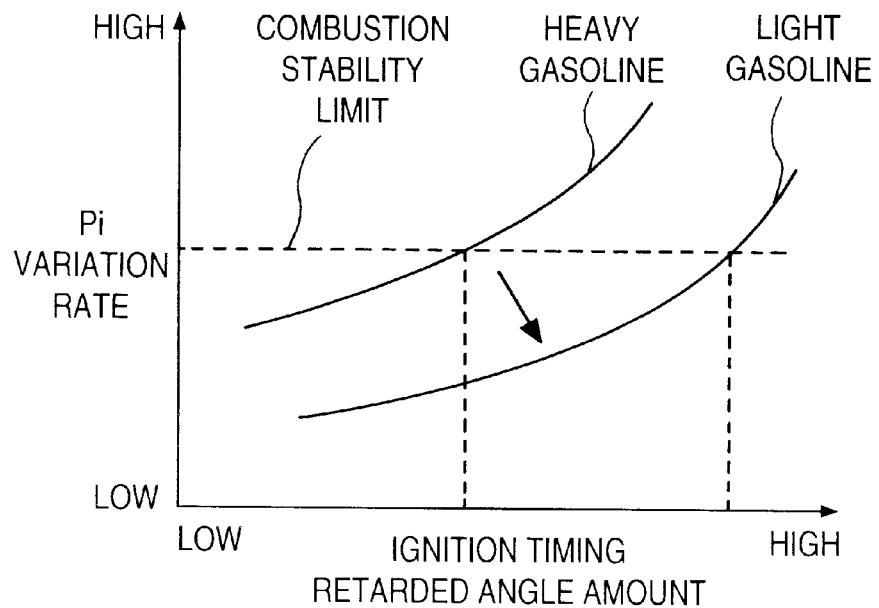
FIG. 8 is a graph showing a change characteristic of a shown average effective pressure as a function of an ignition timing (amount of retarded angle) by using the nature of a fuel as a parameter.

As shown in FIG. 8, a variation rate (ordinate in FIG. 8) of an average effective pressure Pi of the engine 1 generally tends to increase as the ignition timing is retarded. The variation rate largely changes depending on the nature of a fuel, e.g., a heavy fuel or a light fuel. Therefore, the control stability of the feedback control of the idle speed considerably changes depending on the nature of the fuel. Depending on the difference among engines 1, the control stability of the feedback control of the idle speed changes. For this reason, when the control gain in the feedback control of the idle speed is uniquely set on the basis of, e.g., the water temperature of the engine, the control accuracy can be sufficiently improved. However, in the feedback control of the idle speed according to the present invention, the stability of the control is considerably improved. For this reason, the control accuracy of the feedback control of the idle speed can be sufficiently improved without depending on the nature of the fuel or the difference among engines.

Figure 9:
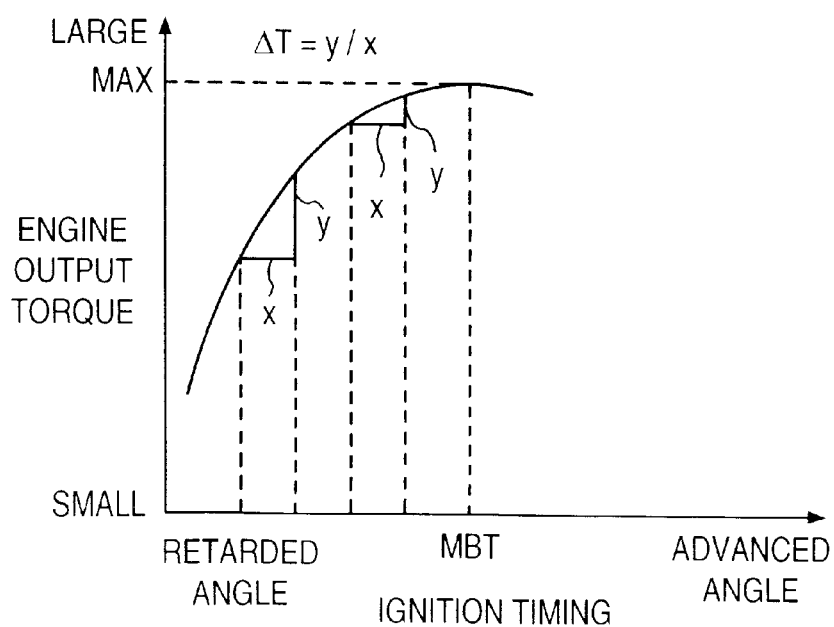
FIG. 9 is a graph showing dependency of an output torque of the engine to an ignition timing.

As shown in FIG. 9, when the other conditions than the ignition timing are not changed, on the retarded angle side from the MBT, as the ignition timing is retarded, a variation rate $\Delta T$ with respect to an amount of retarded angle of the ignition timing increases. For this reason, when the feedback control of the idle speed is performed by using the ignition timing as a control variable, a change amount of output torque with respect to a change in ignition timing increases as the ignition timing is on the retarded angle side. Therefore, when a control gain in the feedback control of the idle speed is made constant, the output torque largely changes depending on the degree of a retarded angle of the ignition timing, and the control accuracy is degraded.

Figure 10:
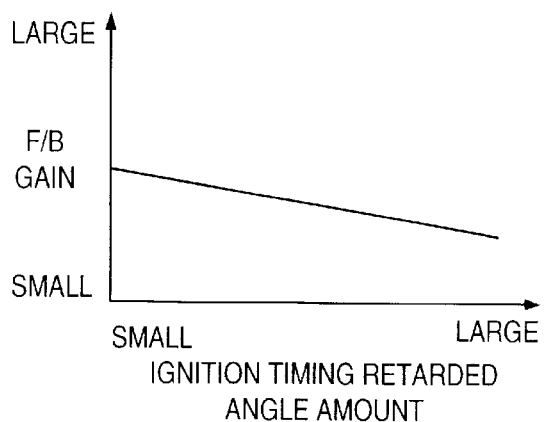
FIG. 10 is a graph showing a change characteristic of a control gain of a feedback control of an idle speed using an ignition timing as a control variable as a function of an ignition timing retarded angle amount.

As shown in FIG. 10, the control gain in the feedback control of the idle speed is decreased as the ignition timing is on the retarded angle side. In FIG. 10, since the abscissa indicates an ignition timing retarded angle amount, the value of an amount of retarded angle is relatively large on the right side of the abscissa. For this reason, it is means that the ignition timing is relatively retarded. In this manner, an output torque with respect to the feedback control variable is stabilized and made constant, and the stability or control accuracy of the feedback control of the idle speed is improved. More specifically, the feedback control of the idle speed and the roughness control can be harmonized, and the control accuracies of both the controls can be improved. Therefore, in cold starting, the idle speed can trace the target idle speed, warming up of the engine or an increase in temperature of an exhaust gas purification catalyzer can be promoted while a change in torque (roughness) is set within an allowable range. For this reason, fuel consumption performance and emission performance can be considerably improved.

<Outline of A/F Roughness Control>

The feedback control of the idle speed and the roughness control are performed by using an air-by-fuel ratio but an ignition timing as a control variable, a control gain in the feedback control of the idle speed is preferably decreased as a roughness control (air-by-fuel ratio) is lean.

Figure 11:
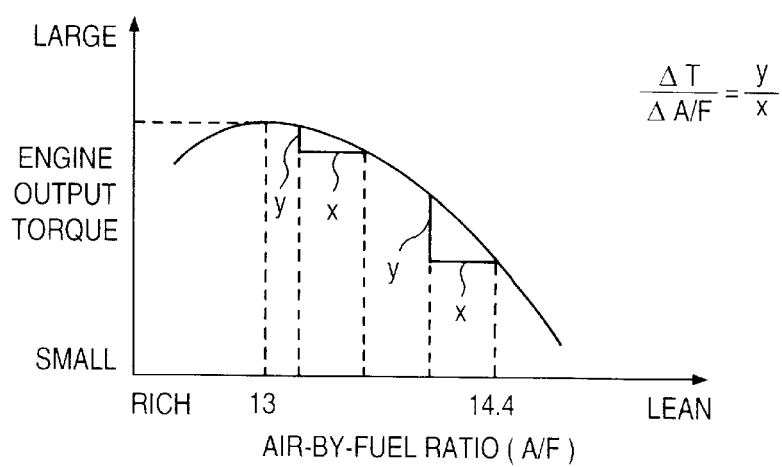
FIG. 11 is a graph showing dependency of an output torque of the engine to an air-by-fuel ratio.
Figure 12:
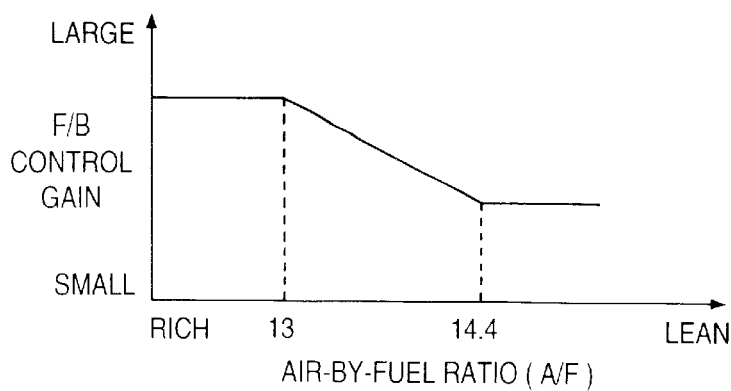
FIG. 12 is a graph showing a change characteristic of a control gain of a feedback control of an idle speed using an air-by-fuel ratio as a control variable as a function of the air-by-fuel ratio.
Figure 13:
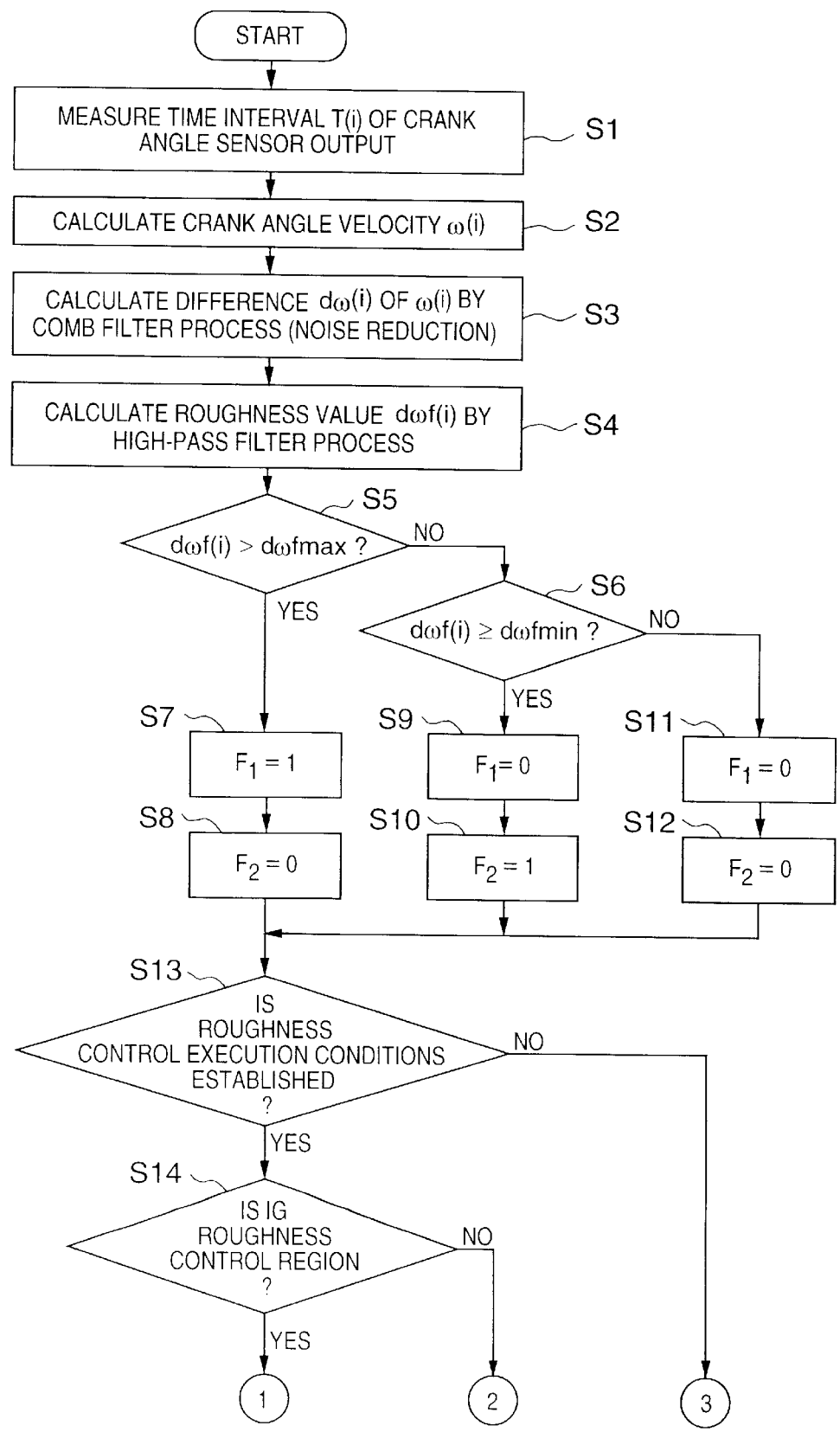
FIG. 13 is a part of a flow chart showing a method of controlling a roughness control performed by an ECU.
Figure 14:
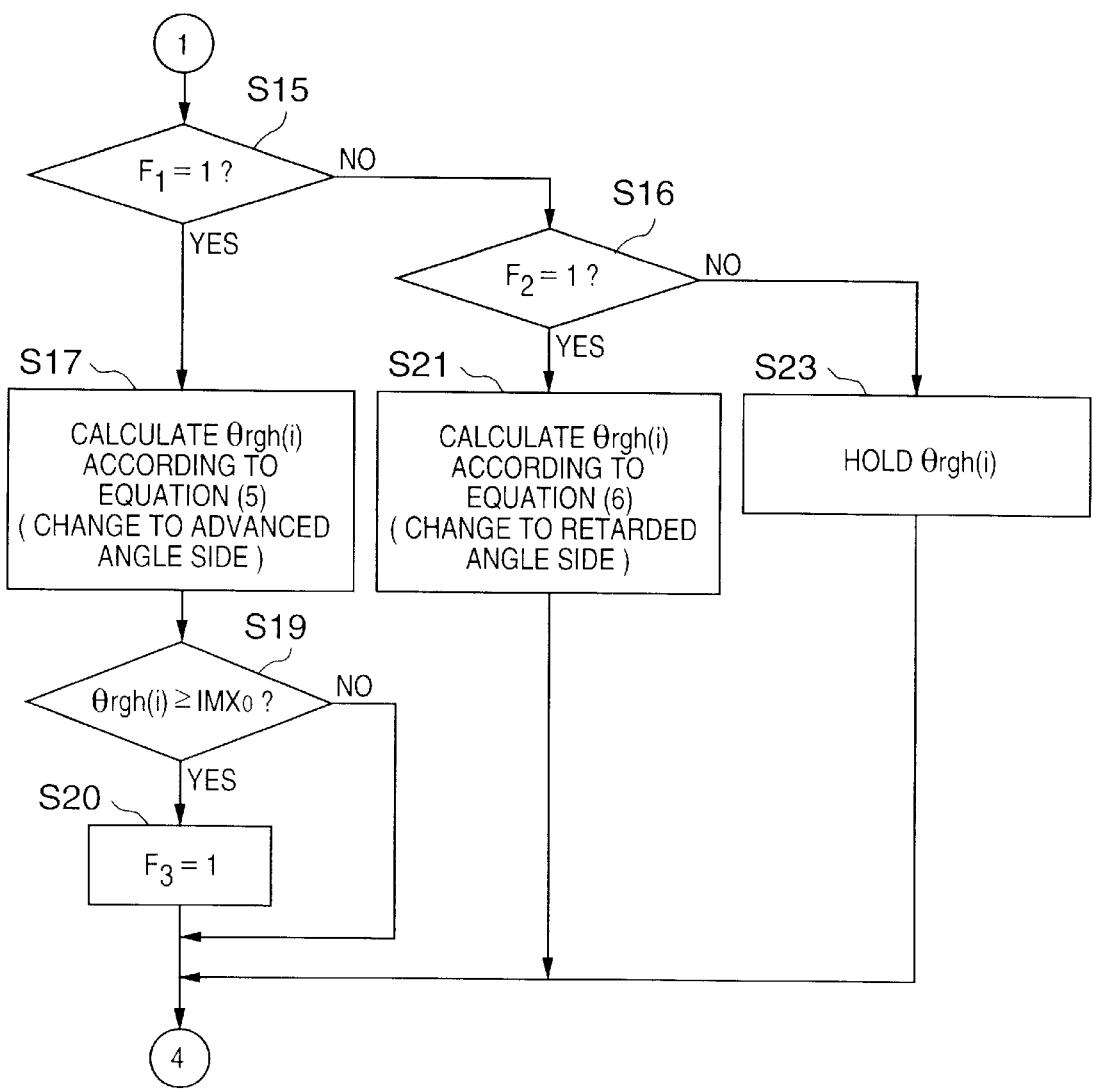
FIG. 14 is a part of the flow chart showing the method of controlling the roughness control performed by the ECU.

More specifically, as shown in FIG. 11, when the other conditions than the air-by-fuel ratio are not changed, in a region in which the air-by-fuel ratio is lean with respect to about 13, the rate of a change $\Delta T$ of an output torque (variation rate of output torque) $\{\Delta T/(\Delta A/F)\}$ with respect to a change $\Delta A/F$ of the air-by-fuel ratio increases as the air-by-fuel ratio is lean. For this reason, when the feedback control of the idle speed is performed by using the air-by-fuel ratio as a control variable, a change amount of the output torque with respect to the change in air-by-fuel ratio increases as the air-by-fuel ratio is lean. Therefore, when the control gain in the feedback control of the idle speed is made constant, the output torque is largely changed by the air-by-fuel ratio, an the control accuracy is degraded. As shown in FIG. 12, the control gain in the feedback control of the idle speed is preferably decreased as the air-by-fuel ratio is lean. In fact, in FIG. 12, as an example, an F/B control gain is kept at a predetermined value in a region in which the air-by-fuel ratio is rich, i.e., lower than 13. However, in a region in which an air-by-fuel ratio, at which the variation rate of the output torque has a large negative value, is 13 or more and lower than 14.4, the control gain proportionally decreases as the air-by-fuel ratio increases (is lean). In a region in which the air-by-fuel ratio is lean, i.e., 14.4 or more, the control gain is made constant. When the control gain is set as shown in FIG. 12, an output torque with respect to the feedback control variable is stabilized or made constant, and the control accuracy of the feedback control of the idle speed is improved. More specifically, the feedback control of the idle speed and the roughness control can be harmonized with each other, and the control accuracies of both the controls can be improved.

The control procedure shown in FIG. 13 to FIG. 18 (to be described later) is realized by a control program stored in a ROM (not shown) in the ECU 35.

<Details of Control>

A concrete control method for the roughness control will be described below with reference to the flow charts shown in FIG. 13 to FIG. 18.

As shown in FIG. 13 to FIG. 18, in the roughness control, first, in step S1, a time interval T(i) required to change a crank angle from 104° after a top death center to 174° (ATDC 104° CA to ATDC 174° CA) is measured on the basis of an output signal from the crank angle sensor 30. Here, a subscript i means this measurement.

Subsequently, in step S2, a crank angle velocity $\omega(i)$ is calculated by using the following equation (2) on the basis of the time interval T(i) measured in step S1. More specifically, since the difference between ATDC 104° CA and ATDC 174° CA is about 70° CA, $$\omega(i) = 70 \cdot 10^6 / T(i) \qquad (2)$$

where T(i): time interval [μsec], and ω(i): crank angle velocity [degree CA)/sec].

In this case, a method of determining ATDC 104° CA to ATDC 174° CA set as a crank angle range in which the crank angle velocity ω(i) is to be detected will be described below with reference to FIG. 19 to FIG. 21.

Figure 19:
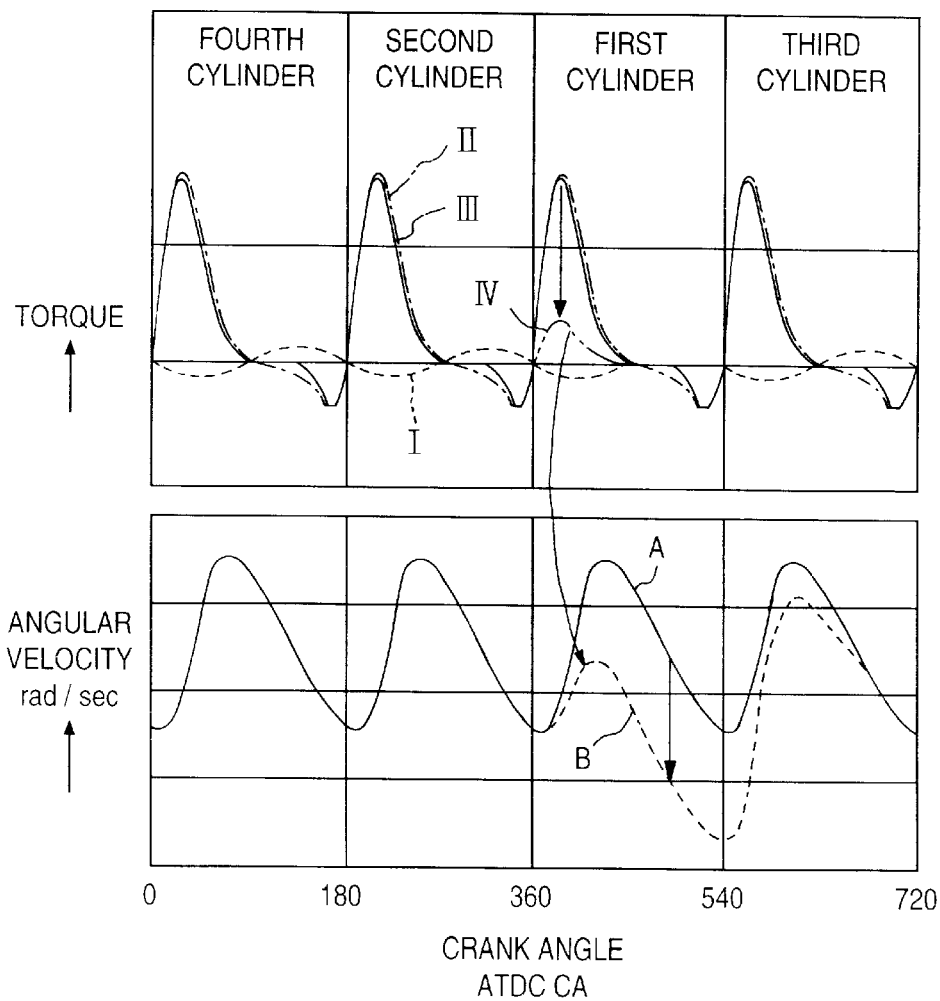
FIG. 19 shows a table of strokes of the cylinders of a straight four-cylinder four-cycle engine and a graph showing a change of a torque and an angular velocity as a function of a change in crank angle.

FIG. 19 is a graph showing change characteristics of a torque and an angular velocity with respect to a crank angle (ATDC CA) after a top death center in a straight four-cylinder four-cycle engine. As shown in FIG. 19, a composite torque between an inertia pressure torque (broken line I) and a gas pressure torque (alternate long and short dash line II) in each cylinder periodically changes at intervals of 180° CA in normal combustion, as indicated by a bold solid line III in FIG. 19, and the angular velocity (solid line A) of the crank shaft rotated by the composite torque periodically changes.

For example, when a combustion state in the first cylinder is unstable to cause an almost accident ignition, the composite torque of the engine becomes extremely low as indicated by a two-dot long and two short dashes line in FIG. 19. As a result, the crank angle velocity considerably decreases on the middle of the expansion stroke of the first cylinder, as indicated by a broken line B, and the difference between the present crank angle velocity and the crank angle velocity in normal combustion becomes large. In the cylinder (third cylinder) ignited next, the clank angle velocity is low in the first half of an expansion stroke in which the influence of a cylinder (first cylinder) previously ignited remains, the crank angle velocity is gradually close to a normal value as the stroke progresses.

Figure 20:
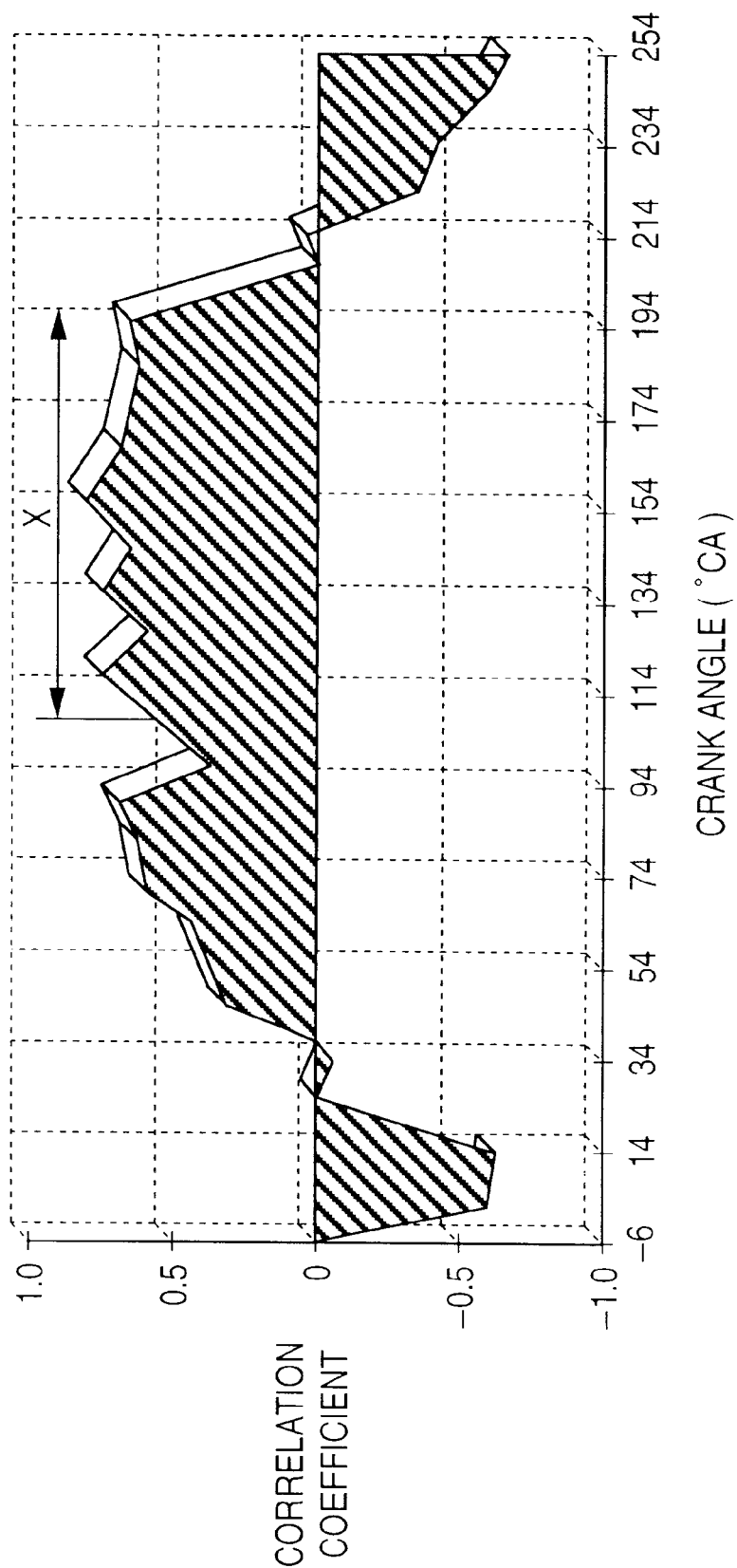
FIG. 20 is a correlation between a combustion pressure and a change in angular velocity.

FIG. 20 is a graph showing a correlation between a combustion pressure and a change in angular velocity (roughness state) In FIG. 20, an abscissa indicates a crank angle (ATDC CA) after compression top death center (ATDC) of one certain cylinder, and an ordinate indicates a correlation representing the degree of an influence of the combustion state (gas pressure) of the corresponding cylinder to an angular velocity. Referring to FIG. 20, the correlation is expressed as a coefficient having a positive value and a negative value. If the correlation coefficient is positive, this means that the correlation between the change in combustion pressure in the cylinder and the change in angular velocity is high; and if the correlation coefficient is negative, this means that the correlation is low, i.e., the influence of the change in combustion pressure in the cylinder is larger than that in the previous cylinder.

As is apparent from FIG. 19 and FIG. 20, in the range of a crank angle (about ATDC 40° CA) at which fuel supply to a cylinder is almost finished to a crank angle (about ATDC 200° CA) near a combustion start timing of the cylinder ignited next, the correlation between the combustion pressure and the change in angular velocity is high. Especially, in a period X (ATDC 100° CA to ATDC 200° CA) in which an inertia torque exhibits a large value after the gas pressure torque decreases to pass through a torque inflection point (about ATDC 90° CA), the correlation becomes high. Therefore, for example, when the angular velocity is detected in the period X (i.e., the range of ATDC 100° CA to ATDC 200° CA), the combustion state of the cylinder can be checked at a high accuracy on the basis of the change of the angular velocity (roughness state). In order to sufficiently assure an angular velocity detection time, a crank angle period for detecting the angular velocity is preferably set to be 60° CA or more.

Figure 21:
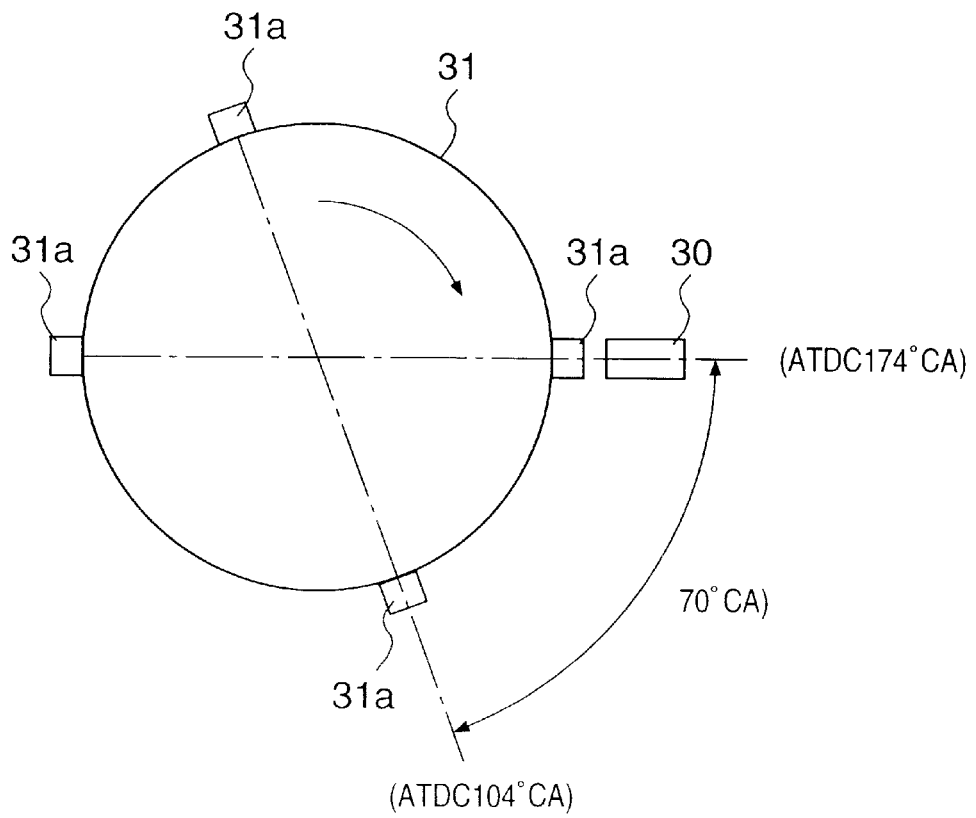
FIG. 21 is a schematic view showing the arrangement of a detected plate and a crank angle sensor for detecting a crank angle.

For example, as shown in FIG. 21, in this embodiment, a plurality of projections 31a are formed on the detected plate 31 such that the timing of ATDC 104° CA in each cylinder and the timing of ATDC 174° CA are detected, and the period having about 70° CA between ATDC 104° CA to 174° CA is determined, so that a crank angle velocity ω in the period is detected.

A difference dω(i) of the crank angle velocity ω(i), i.e., a change in crank angle velocity dω(i) is calculated by a comb filter process using the next equation (3). By the filter process, a factor to be noise serving as the determination of a combustion state in each cylinder can be removed. Identification of a cylinder is performed on the basis of a signal from a sensor for detecting a rotating angle of a cam shaft (not shown).

$$d\omega(i) = \omega(i-4) - \omega(i) \qquad (3)$$

where ω(i) is a calculated value of a present crank angle, and ω(i−4) is a calculated value of a crank angle calculated four times before. Although the roughness originally means a change in torque caused by a change in combustion, the change in angular velocity is measured such that the change in angular velocity includes other various changes than the change in combustion state. Except for the change in combustion state, as reasons for generating the change in angular velocity, the followings are known:

a change in angular velocity (I) caused by the influence of resonance generated by using a resonance source as explosion (I);

a change in angular velocity caused by wheel rotation by the unbalance of wheels or a drive system (II);

a change in angular velocity caused by the influence of vibration acting from a road surface to a tire; and the like. The three change factors (I, II, and III) are shown in FIG. 22.

Figure 22:
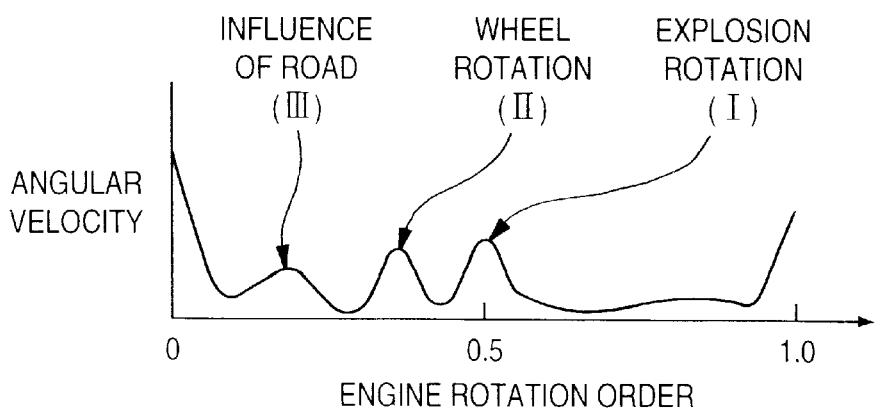
FIG. 22 is a graph showing a change in angular velocity by a noise factor.

As shown in FIG. 22, noise (I) caused by resonance generated by explosion in a cylinder is generated by a 0.5-order frequency of an engine rotation and a frequency which is integer times the 0.5-order frequency of the engine rotation, and noise (II) caused by unbalance of the wheels or the drive system or noise (III) caused by the influence of the road surface is generated in a low-frequency range lower than the 0.5-order frequency of the engine rotation.

In this step S3, the 0.5-order frequency component of the engine rotation and the frequency component which is integer times the 0.5-order frequency component are removed by the comb filter process to remove the three noise components from the change in velocity, so that the change in angular velocity dω(i) of the crank angle is calculated.

Figure 23:
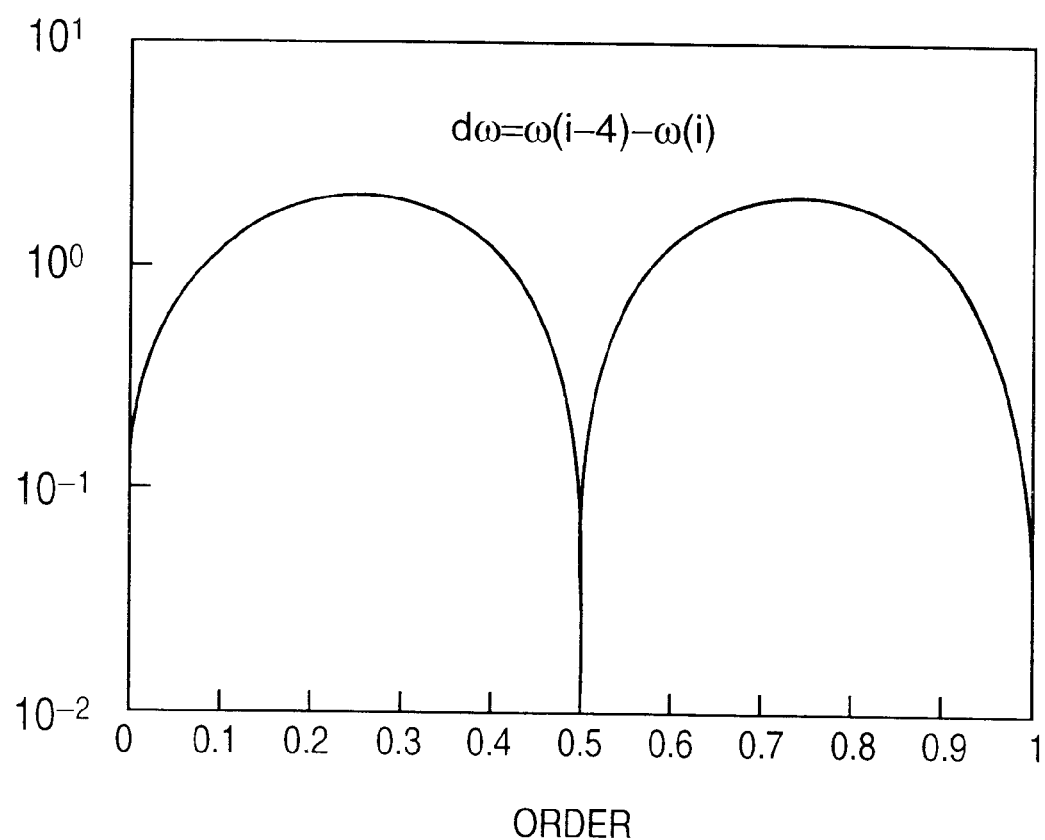
FIG. 23 is a graph showing an attenuation characteristic obtained after the data of the detected angular velocity passes through a comb filter to remove a 0.5-order frequency component of an engine rotation and a component which is integer times the 0.5-order frequency component from the data.

More specifically, as shown in FIG. 23, the difference a present value w(i) and a previous value ω(i−4) of a crank angle velocity in the same cylinder is calculated, so that data of the change in crank angle velocity dω(i) from which the 0.5-order frequency component of the engine rotation and the frequency component which is integer times the 0.5-order frequency component are removed by the comb filter process can be obtained.

Subsequentially, in step S4, by using the following equation (4), a roughness value $d\omega_f(i)$ is calculated by a high-pass filter. This high-pass filter process is performed to remove noise having a frequency component lower than the 0.5-order frequency component of the engine rotation from the change in crank angle velocity dω(i). For this purpose, an annealing process is performed on the basis of data before eight cycles of the change in crank angle velocity dω(i) obtained in step S3 to calculate the roughness value dω$_f$(i).

$$d\omega_f(i) = k_1 \cdot d\omega(i-4) + \quad (4)$$
$$k_2 \cdot [d\omega(i-3) + d\omega(i-5)] +$$
$$k_3 \cdot [d\omega(i-2) + d\omega[i-6)] +$$
$$k_4 \cdot [d\omega(i-1) + d\omega(i-7)] +$$
$$k_5 \cdot [d\omega(i) + d\omega(i-8)]$$

In Equation (4), $k_1$ to $k_5$ denote annealing coefficients (constants).

Figure 24:
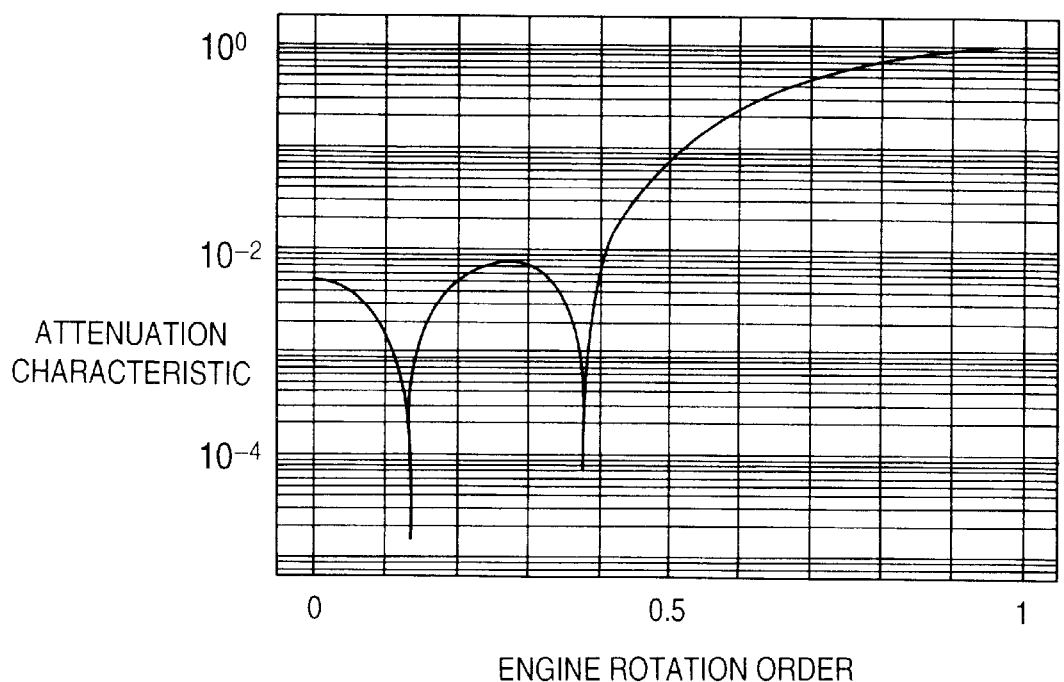
FIG. 24 is a graph showing an attenuation characteristic after the data shown in FIG. 23 passes through a high-pass filter to remove a frequency component lower than the 0.5-order frequency component of the engine rotation.

By the high-pass filter process, as shown in FIG. 24, a frequency component lower than the 0.5-order frequency component of an engine speed is sufficiently attenuated and removed. In this manner, a roughness value dω$_f$(i) (i.e., a crank angle velocity variation or a torque variation) which reflects a combustion state of each cylinder at a high accuracy can be obtained.

In step S5 and step S6, it is checked whether the roughness value dω$_f$(i) calculated in step S4 exceeds a maximum threshold value dω$_f$max, is equal to or smaller than a minimum threshold value dω$_f$min, or is set within the range of maximum threshold value dω$_f$max to the minimum threshold value dω$_f$min.

In this case, if the roughness value dω$_f$(i) exceeds the maximum threshold value dω$_f$max, a change in crank angle velocity or a change in torque (roughness) is very large, and smooth driving of the engine 1 may be degraded. For this reason, it is a required limit value that the roughness value is rapidly decreased, i.e., an ignition timing is advanced to the advanced angle side. The maximum threshold value dω$_f$max is preferably set depending on an engine speed and an intake air filling efficiency by searching a map having the engine speed and the intake air filling efficiency (engine load).

On the other hand, if the roughness value is equal to or smaller than the minimum threshold value dω$_f$min, the change in crank angle velocity or the change in torque may be very small. Therefore, the roughness value may represent that driving of the engine 1 has been sufficiently stabilized, and suppression of the roughness value may be moderated. That is, the minimum threshold value dω$_f$min is a limit value at which the ignition timing may be retarded to the retarded angle side. Like the maximum threshold value dω$_f$max, the minimum threshold value dω$_f$min is preferably set depending on an engine speed and an intake air filling efficiency by searching a map having the engine speed and the intake air filling efficiency (engine load).

In this manner, if it is determined in step S5 that the roughness value dω$_f$(i) exceeds the maximum threshold value dω$_f$max (YES in step S5), "1" is set in a large-roughness detection flag $F_1$ in step S7, and "0" is set in a small-roughness detection flag $F_2$ in step S8.

If it is determined in step S5 and step S6 that the roughness value dω$_f$(i) is equal to or smaller than the minimum threshold value dω$_f$min (NO in step S5 and YES in step S6), "0" is set in the large-roughness detection flag $F_1$ in step S9, and "1" is set in the small-roughness detection flag $F_2$ in step S10.

If it is determined in step S5 and step S6 that the roughness value dω$_f$(i) is set within the range of the maximum threshold value dω$_f$max to the minimum threshold value dω$_f$min (NO in step S5 and NO in step S6), "0" is set in the large-roughness detection flag $F_1$ in step S11, and "0" is set in the small-roughness detection flag $F_2$ in step S12.

More specifically, the flags $F_1$ and $F_2$ hold the state of the detected roughness.

TABLE 1

| Roughness dω$_f$(i)? | $F_1$ large-roughness detection flag | $F_2$ small-roughness detection flag |
|---|---|---|
| dω$_f$ (i) ≧ dω$_f$max | 1 (ignition timing is advanced to advanced angle side) | 0 |
| dω$_f$ (i) < dω$_f$min | 0 | 1 (ignition timing may be retarded to retarded angle side) |
| dω$_f$min ≦ dω$_f$ (i) < dω$_f$max | 0 | 0 |

In step S13, it is checked whether roughness control execution conditions are established. In this roughness control, it is determined that the roughness control execution conditions are established when the three following conditions ((i) to (iii)) are established at once, so that the roughness control is executed.

(i): In engine starting, a predetermined period of time (e.g., one second) has elapsed after a perfect explosion state is set. It is determined that the perfect explosion state is set when an engine speed increases to 500 r.p.m. after cranking. Immediately after the perfect explosion state is set, the rotation of the engine 1 is relatively unstable. Since it is not preferable that the roughness control is executed in such time, the roughness control is not started until the predetermined period of time elapses.

Figure 18:
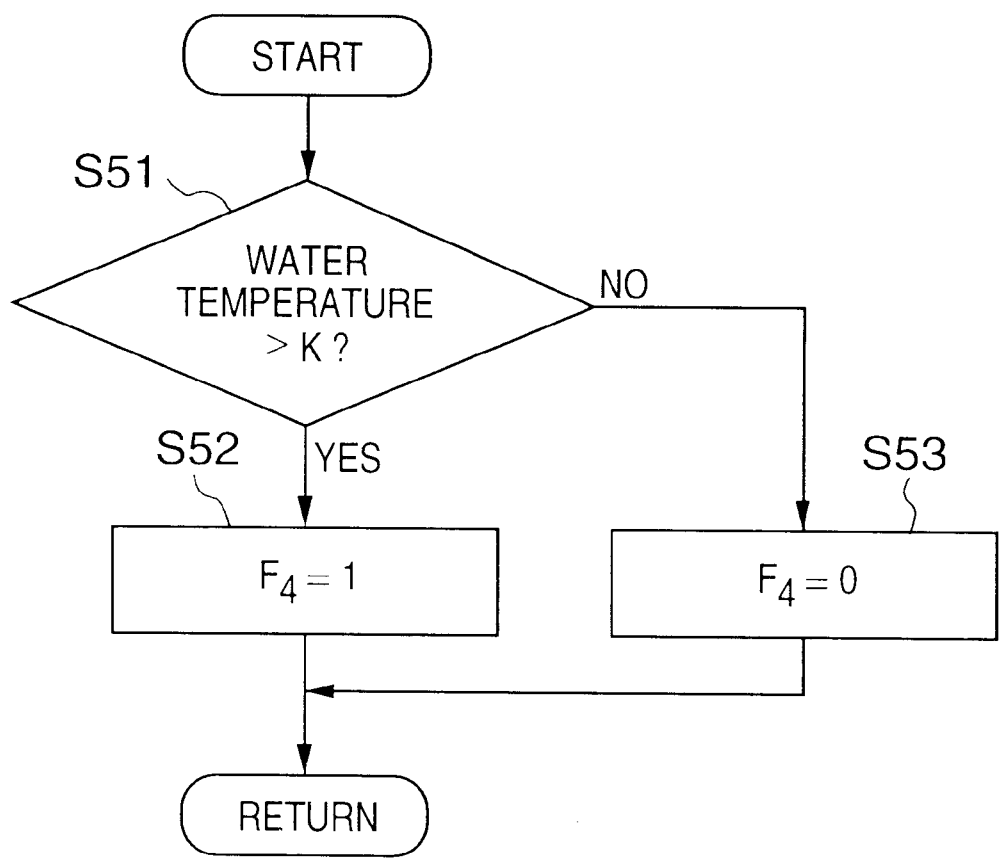
FIG. 18 is a flow chart showing a method of setting an engine warming-up flag in the roughness control performed by the ECU.

(ii): A water temperature of the engine is equal to or lower than a predetermined temperature (e.g., 60° C.). That is, an engine warming-up flag $F_4$ (to be described later) is "0". The engine warming-up flag $F_4$, as shown in FIG. 18, is set at "1" (in step S52) when it is determined in step S51 that the water temperature of the engine exceeds a predetermined temperature K (e.g., 60° C.), and is set at "0" (in step S53) when it is determined that the water temperature of the engine is equal to or lower than the predetermined temperature K. Since the engine 1 has been set in a warming-up state when the water temperature of the engine exceeds the predetermined temperature, a large retarded angle control of an ignition timing for promoting warming up of the engine 1 or an increase in temperature of a catalytic converter rhodium, therefore, a roughness control need not be performed.

(iii): The drive state of the engine 1 is set in the closed-valve region (intake air flow strengthening region) in FIG. 3. When the roughness control is performed, combustion performance of a fuel-air mixture in the combustion chamber 6 must be improved to improve the rotation stability of the engine 1.

Figure 16:
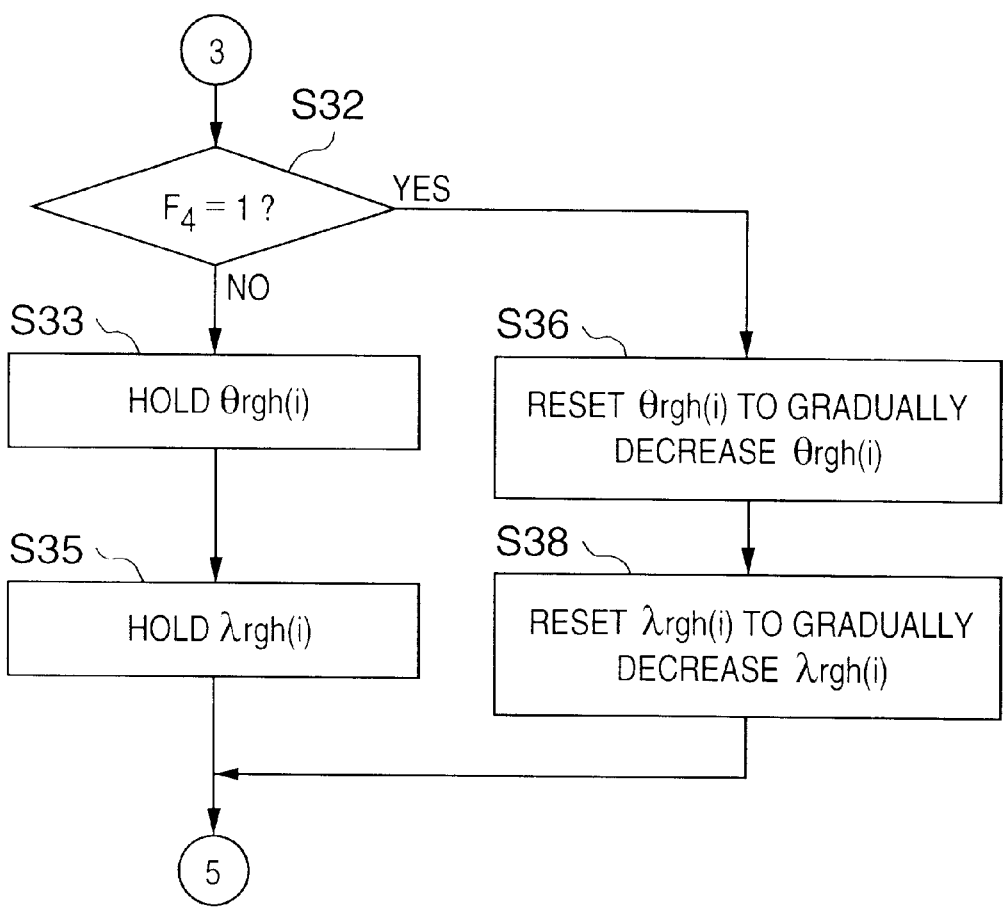
FIG. 16 is a part of the flow chart showing the method of controlling the roughness control performed by the ECU.

In this manner, if it is determined in step S13 that the roughness control execution conditions are not established (NO), i.e., if at least one of the roughness control execution conditions is not established, in order to temporarily stop or end the roughness control, the control flow skips to step S32 (to be described later) (FIG. 16).

On the other hand, if it is determined in step S13 that the roughness control execution conditions are established (YES), i.e., if all the roughness control execution conditions are established, step S14 is executed. In step S14, it is checked whether the drive state of the engine 1 is set in an IG roughness control region in which the roughness control is performed by controlling an ignition timing or an A/F roughness control region in which the roughness control is performed by controlling an air-by-fuel ratio (amount of fuel injection).

In step S14, an IG roughness control is performed when the IG roughness control inhibition flag $F_3$ is set at "0" and the engine 1 is in an idle state; and an A/F roughness control is performed when the IG roughness control inhibition flag $F_3$ is set at "1" or the engine 1 is in a non-idle (off-idle) state.

TABLE 2

|  | IG roughness control inhibition flag $F_3$ | idle state |
| --- | --- | --- |
| IG roughness control is NO | 0 and | YES |
| A/F roughness control is YES | 1 or | NO |

The IG roughness control inhibition flag $F_3$ is a flag set at "1" (in step S20) when a roughness control variable (correction variable) in the IG roughness control is maximally on the advanced angle side. Therefore, when the IG roughness control inhibition flag $F_3$ is set at "1", an output torque of the engine 1 cannot be increased by controlling the ignition timing. Therefore, the IG roughness control cannot be substantially performed.

In this manner, if it is determined in step S14 that the drive state of the engine 1 is set in a drive region in which the IG roughness control is to be performed (YES), the IG roughness control variable is calculated or held (maintained in this state) in step S15 to step S24.

More specifically, it is checked in step S15 whether the large-roughness detection flag $F_1$ is "1". If it is determined that the large-roughness detection flag $F_1$ is set at "1" (YES), i.e., if a state $d\omega_f(i) \geq d\omega_f max$ is detected, when a torque must be increased by advancing the ignition timing, in step S17, an IG roughness control variable $\theta_{rgh}(i)$ of a present cylinder i is calculated by using the following equation (5). The IG roughness control variable $\theta_{rgh}(i)$ of the cylinder is basically obtained by correcting an IG roughness control variable $\theta_{rgh}(i-1)$ of the previous cylinder on the advanced angle side.

$$\theta_{rgh}(i)=\theta_{rgh}(i-1)+\min[K_1 \cdot \{d\omega_f(i)-d\omega_{fmax}\}, \Delta ig_{ad}] \quad (5)$$

$\theta_{rgh}(i)$: IG roughness control variable of present cylinder $\theta_{rgh}(i-1)$: IG roughness control variable of previous cylinder min [α, β, . . . ]: minimum value of α, β, . . .

$K_1$: proportional constant $d\omega_f(i)$: roughness value $d\omega_{fmax}$: maximum threshold value $\Delta ig_{ad}$: advanced angle correction variable.

Note that $\Delta ig_{ad}$ is preferably set depending on an engine speed and an intake air filling efficiency by searching a map having an engine speed $N_E$ and an intake air filling efficiency γ as parameters. More specifically, $\Delta ig_{ad}$ is a function of the engine speed $N_E$ and the intake air filling efficiency γ, and is given by the following equation:

$$\Delta ig_{ad}=\Delta ig_{ad}(N_E, \gamma) \quad (6)$$

In step S17, when the calculated value $\theta_{rgh}(i)$ of each cylinder calculated by Equation (5) is larger than a predetermined limit value $IMX_0$, the following equation is established:

$$\theta_{rgh}(i)=IMX_0$$

In this equation, the limit value $IMX_0$ is a limit value of $\theta_{rgh}(i)$ of each cylinder on the advanced angle side, i.e., a limiter. When $\theta_{rgh}(i)$ reaches $IMX_0$, $\theta_{rgh}(i)$ cannot be further changed on the advanced angle side.

In step S19, it is checked whether the IG roughness control variable θrgh(i) calculated in step S17 is equal to the limit value $IMX_0$. If $\theta_{rgh}(i) > IMX_0$ is established (YES), "1" is set in the IG roughness control inhibition flag $F_3$ in step S20. If $\theta_{rgh}(i) > IMX_0$ is not established (NO), step S20 is skipped. The IG roughness control inhibition flag $F_3$ is a flag in which "1" is set when the roughness control variable (correction variable) in the IG roughness control is maximally on the advanced angle side. For this reason, when the IG roughness control inhibition flag $F_3$ is set at "1", the output torque of the engine 1 cannot be increased any more by controlling the ignition timing. This means that the IG roughness control cannot be executed. Therefore, when "1" is set in the IG roughness control inhibition flag $F_3$, an A/F roughness control (to be described later) is executed. Thereafter, the control flow shifts to step S44.

If it is determined in step S15 that the large-roughness detection flag $F_1$ is not "1" (NO), it is checked in step S16 whether the small-roughness detection flag $F_2$ is set at "1". In this case, it is determined that the small-roughness detection flag $F_2$ is set at "1" (YES), i.e., if it is determined in step S6 that $d\omega_f(i) < d\omega_f min$ is established, the torque must be decreased by retarding the ignition timing. For this reason, the IG roughness control variable θrgh(i) of the present cylinder is calculated by using the following equation (7) in step S21. The IG roughness control variable $\theta_{rgh}(i)$ of the cylinder is basically obtained by correcting an IG roughness control variable $\theta_{rgh}(i-1)$ of the previous cylinder on the retarded angle side.

$$\theta_{rgh}(i)=\theta_{rgh}(i-1)+\min[K_1 \cdot \{d\omega_f(i)-d\omega_{fmax}\}, \Delta ig_{ret}] \quad (7)$$

$\theta_{rgh}(i)$: IG roughness control variable of present cylinder $\theta_{rgh}(i-1)$: IG roughness control variable of previous cylinder $\Delta ig_{ret}$: retarded angle correction variable.

Like $\Delta ig_{ad}$, $\Delta ig_{ret}$ is preferably set depending on an engine speed and an intake air filling efficiency by searching a map having an engine speed and an intake air filling efficiency as parameters. More specifically, $\Delta ig_{ret}$ is a function of the engine speed $N_E$ and the intake air filling efficiency γ, and is given by the following equation:

$$\Delta ig_{ret}=\Delta ig_{ret}(N_E, \gamma) \quad (8)$$

When the calculated value $\theta_{rgh}(i)$ of each cylinder calculated by Equation (7) is larger than the predetermined limit value $IMX_0$, $\theta_{rgh}(i)$ is made equal to $IMN_0$. The limit value $IMN_0$ is a limit value of $\theta_{rgh}(i)$ of each cylinder on the retarded angle side, i.e., a limiter. When $\theta_{rgh}(i)$ reaches $IMN_0$, $\theta_{rgh}(i)$ cannot be further changed on the retarded angle side. Thereafter, the control flow shifts to step S44.

If it is determined in step S16 that the small-roughness detection flag $F_2$ is not set at "1" (NO), i.e., if it is determined that the roughness value is set within the maximum threshold value $d\omega_f max$ and the minimum threshold value $d\omega_f min$, a change in crank angle velocity or a change in torque (roughness) is not considerably large and is not so small that the ignition timing is more retarded. For this reason, the present IG roughness control variable is held. More specifically, in this case the IG roughness control variable θrgh(i−1) of the previous cylinder is held as the IG roughness control variable θrgh(i) of the present cylinder. Thereafter, the control flow shifts to step S44 (FIG. 17).

Figure 17:
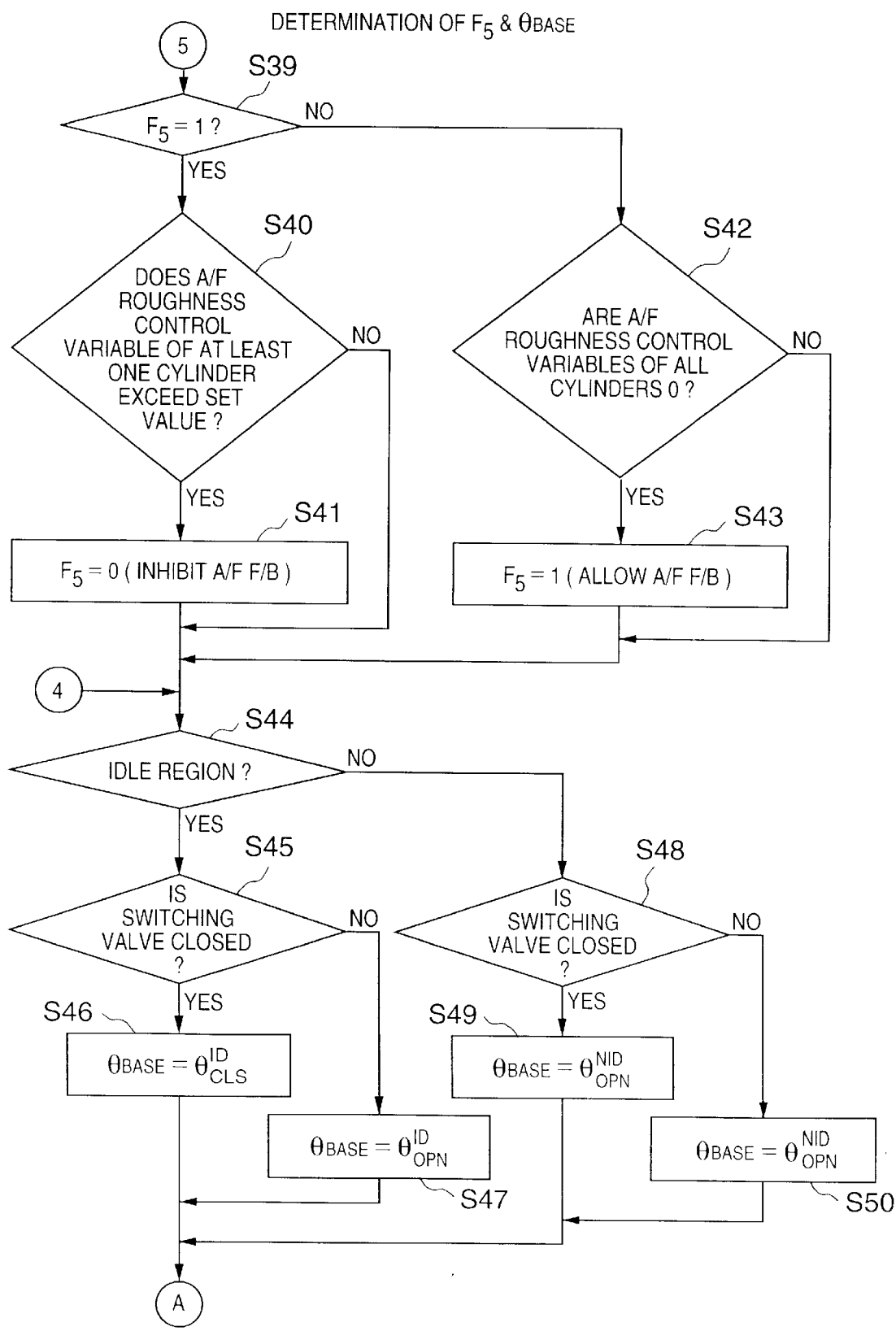
FIG. 17 is a part of the flow chart showing the method of controlling the roughness control performed by the ECU.

A control procedure in step S44 to step S50 in FIG. 17 determines a basic ignition timing $\theta_{BASE}$.

In step S44 in FIG. 17, it is checked whether the drive state of the engine is in an idle region. If the drive state is in the idle region (YES), it is checked in step S45 whether the switching valve 18 is in a closed-valve region (see FIG. 3). If the switching valve 18 in the closed-valve region (YES), in step S46, at the basic ignition timing $\theta_{BASE}$, a basic value basic value $\theta^{ID}{}_{CLS}$ of the ignition timing which is set for an idle state in the closed-valve state of the switching valve 18 in advance is set. On the other hand, if the switching valve 18 is not in the closed-valve region (NO), in step S47, at the basic ignition timing $\theta_{BASE}$, a basic value $\theta^{ID}{}_{OPN}$ in an open-valve state of the switching valve 18 is set.

If it is determined in the determination of step S44 that the drive state of the engine 1 is in a non-idle region (NO), in step 48, as in step S45, it is checked whether the switching valve 18 is in the closed-valve region. If the switching valve 18 is in the closed-valve state (YES), in step S49, at the basic ignition timing $\theta_{BASE}$, a basic value basic value $\theta^{NID}{}_{CLS}$ of the ignition timing which is set for a non-idle state in the closed-valve state of the switching valve 18 in advance is set. On the other hand, if the switching valve 18 is not in the closed-valve region (NO), in step S50, at the basic ignition timing $\theta_{BASE}$, a basic value $\theta^{NID}{}_{OPN}$ of an ignition timing for the non-idle state in an open-valve state of the switching valve 18 is set. In this engine system A or the engine 1, the basic ignition timing $\theta_{BASE}$ is set on the more advanced angle side than in the idle state to increase the engine output. Since a combustion rate increases by the influence of the notched portion in the closed-valve state of the switching valve 18, the basic ignition timing $\theta_{BASE}$ is set on the more retarded angle side than in the open-valve state of the switching valve 18. In step S44 to step S50, basic ignition timings $\theta_{BASE}$ are set depending on the idle state and the non-idle state and depending on the open and close states of the switching valve 18, respectively.

TABLE 3

| Valve 18? | idle | | not idle | |
|---|---|---|---|---|
| | closed | open | closed | open |
| $\theta_{BASE}$ | $\theta^{ID}{}_{OPN}$(S46) | $\theta^{ID}{}_{OPN}$(S47) | $\theta^{ID}{}_{OPN}$(S49) | $\theta^{ID}{}_{OPN}$(S50) |

Figure 15:
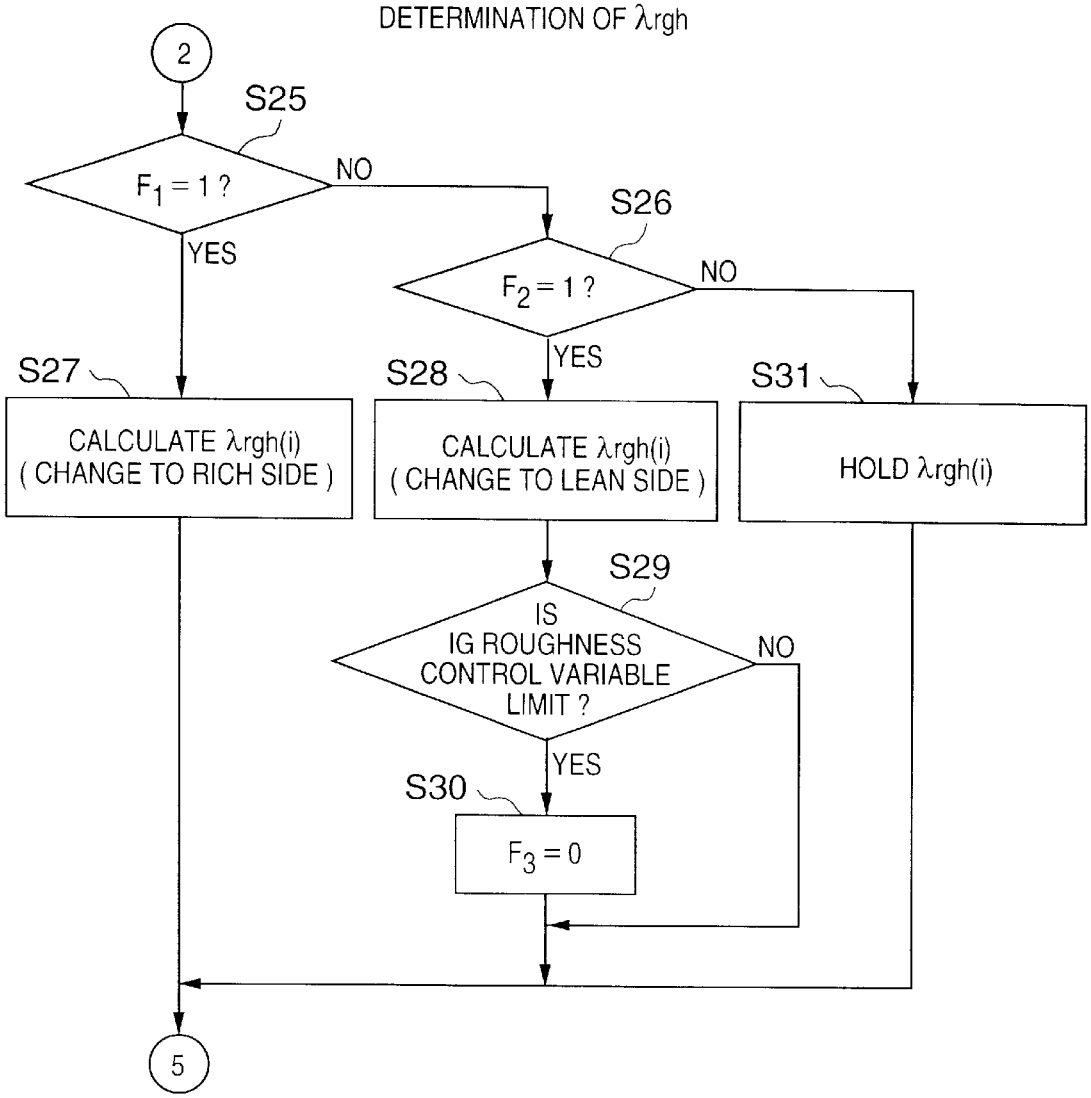
FIG. 15 is a part of the flow chart showing the method of controlling the roughness control performed by the ECU.

If it is determined in step S14 described above that the drive state of the engine 1 is in the IG roughness control region (NO), i.e., if it is determined the drive state of the engine 1 is in the A/F roughness control region, in step S25 to step S31 in FIG. 15, an A/F roughness control variable $\lambda_{rgh}(i)$ is calculated or held (maintained in this state). More specifically, in this case, since it is difficult or substantially impossible to perform the roughness control by changing the ignition timing, the output torque is increased and decreased by changing an air-by-fuel ratio to perform the roughness control.

More specifically, first, it is checked in step S25 whether the large-roughness detection flag $F_1$ is set at "1". If it is determined that the large-roughness detection flag $F_1$ is set at "1" (YES), i.e., if the torque must be increased by changing the air-by-fuel ratio (A/F) on the rich side, in step S27, the A/F roughness control variable $\lambda_{rgh}(i)$ of the present cylinder is calculated by using the following equation (9). The A/F roughness control variable $\lambda_{rgh}(i)$ of the cylinder is obtained by correcting an A/F roughness control variable $\lambda_{rgh}(i-1)$ of the previous cylinder on the rich side by a predetermined amount.

$$\lambda_{rgh}(i)=\lambda_{rgh}(i-1)+KL \quad (9)$$

$\lambda_{rgh}(i)$: A/F roughness control variable of present cylinder $\lambda_{rgh}(i-1)$: A/F roughness control variable of previous cylinder KL: correction value of roughness control variable on rich side (predetermined amount)

When the calculated value $\lambda_{rgh}(i)$ of each cylinder calculated by Equation (9) is larger than a predetermined limit value $FMX_0$, $\lambda_{rgh}(i)$ is made equal to $FMX_0$. The limit value $FMX_0$ is a limit value of $\lambda_{rgh}(i)$ of each cylinder on the rich side, i.e., a limiter. When $\lambda_{rgh}(i)$ reaches $FMX_0$, $\lambda_{rgh}(i)$ cannot be further changed on the rich side. Thereafter, the control flow shifts to step S39.

If it is determined in step S25 that the large-roughness detection flag $F_1$ is not set at "1" (NO), it is checked in step S26 whether the small-roughness detection flag $F_2$ is set to be "1". In this case, if it is determined that the small-roughness detection flag $F_2$ is set at "1" (YES), i.e., the torque must be decreased by changing the air-by-fuel ratio on the lean side, in step S28, the A/F roughness control variable $\lambda_{rgh}(i)$ of the present cylinder is calculated by the following equation (10).

The A/F roughness control variable $\lambda_{rgh}(i)$ of the cylinder is obtained by correcting an A/F roughness control variable $\lambda_{rgh}(i-1)$ of the previous cylinder on the rich side by a predetermined amount.

$$\lambda_{rgh}(i)=\lambda_{rgh}(i-1)+KR \quad (10)$$

$\lambda_{rgh}(i)$: A/F roughness control variable of present cylinder $\lambda_{rgh}(i-1)$: A/F roughness control variable of previous cylinder KR: correction value of roughness control variable on lean side (predetermined amount)

It is checked in step S29 whether the IG roughness control variables of all the cylinders are 0. If the roughness control variables of all the cylinders are 0 (YES), "0" is set in the IG roughness control inhibition flag $F_3$ in step S30. If the IG roughness control variable of at least one cylinder is not 0 (NO), step S30 is skipped. When "0" is set in the IG roughness control inhibition flag $F_3$, the control flow returns to the IG roughness control. Thereafter the control flow shifts to step S39 (FIG. 17).

If it is determined in step S26 that the small-roughness detection flag $F_2$ is not set at "1" (NO), it is determined that the roughness value is set between the maximum threshold value $d\omega_f max$ and the minimum threshold value $d\omega_f min$, a change in crank angle velocity or a change in torque (roughness) is not too large or too small. For this reason, the present A/F roughness control variable is maintained. More specifically, in this case, in step S31, the A/F roughness control variable $\lambda_{rgh}(i-1)$ of the previous cylinder is equal to the A/F roughness control variable $\lambda_{rgh}(i)$ of the present cylinder. Thereafter, the control flow shifts to step S39 (FIG. 17).

In step S39 in FIG. 17, it is checked whether an air-by-fuel ratio feedback control flag $F_5$ is set at "1". If the air-by-fuel ratio feedback control flag $F_5$ is set at "1", a feedback control for giving an air-by-fuel ratio by λ=1 is allowed. If "0" is set, the air-by-fuel ratio feedback control flag $F_5$ is a flag for inhibiting the feedback control of the air-by-fuel ratio. In the A/F roughness control of this embodiment, when the A/F roughness control variable $\lambda_{rgh}$ of at least one cylinder exceeds a predetermined set value, the feedback control of the air-by-fuel ratio is inhibited. When the A/F roughness control variables of all the cylinders become 0, the feedback control of the air-by-fuel ratio is allowed.

In this manner, if it is determined in step S39 that the air-by-fuel ratio feedback control flag $F_5$ is set at "1" (YES), i.e., when the feedback control of the air-by-fuel ratio is allowed, it is checked in step S40 whether the A/F roughness control variable of at least one cylinder of the A/F roughness control variables calculated in step S27 and step S28 described above exceeds a predetermined set value. In this case, if the A/F roughness control variable of at least one cylinder exceeds the predetermined set value (YES), since the A/F roughness control cannot be performed by the air-by-fuel ratio feedback, "0" is set in the air-by-fuel ratio feedback control flag $F_5$ in step S41. Therefore, the feedback control of the air-by-fuel ratio is inhibited. On the other hand, if the A/F roughness control variables of all the cylinders are equal to or lower than the predetermined set value in step S40 (NO), step S41 is skipped, and the air-by-fuel ratio feedback control flag $F_5$ is kept at "1". Therefore, the feedback control of the air-by-fuel ratio is continuously performed. Thereafter, step S44 to step S50 described above are executed, and the control flow returns to step S1 to continuously perform the control.

If it is determined in step S39 described above that the air-by-fuel ratio feedback control flag $F_1$ is set at "1" (NO), i.e., if the air-by-fuel ratio feedback control is inhibited, it is checked in step S42 whether the A/F roughness control variables of all the cylinders are 0. In this case, if the A/F roughness control variables of all the cylinders are almost 0 (YES), the A/F roughness control of each cylinder can also be executed by the air-by-fuel ratio feedback control. For this reason, "1" is set in the air-by-fuel ratio feedback control flag $F_5$ in step S43, and, therefore, the feedback control of the air-by-fuel ratio is allowed. On the other hand, if the A/F roughness control variable of at least one cylinder is not 0 in step S42 (NO), step S43 is skipped, and the air-by-fuel ratio feedback control flag $F_5$ is kept at "0". Therefore, the feedback control of the air-by-fuel ratio is inhibited.

If it is determined in step S13 described above that the roughness control execution conditions are not established (NO), i.e., if at least one of the roughness control execution conditions is not established, the roughness control is temporarily stopped or ended. In this case, it is checked in step S32 whether the engine warming-up flag $F_4$ is set at "1", i.e., it is checked whether the water temperature of the engine exceeds a predetermined temperature (e.g., 60° C.). If the engine warming-up flag $F_4$ is set at "1" (NO), the roughness control is temporarily stopped. In step S33 to step S35, the IG roughness control variables of the respective cylinders and the A/F roughness control variables of the respective cylinders are held (maintained). More specifically, in step S33, the IG roughness control variable θrgh(i−1) of the previous cylinder is equal to the IG roughness control variable θrgh(i) of the present cylinder. In step S35, the A/F roughness control variable $\lambda_{rgh}$(i−1) of the previous cylinder is equal to the A/F roughness control variable $\lambda_{rgh}$(i) of the present cylinder.

Thereafter, step S39 to step S50 described above are executed, the control flow returns to step S1. However, in this case, since the roughness control is temporarily stopped as described above, the roughness control variables held in step S33 to step S35 are not used in the roughness control. That is, when the roughness control is temporarily stopped, the roughness control variables immediately before the stop are held. However, these roughness control variables are only held (stored) in preparation for a case in which the roughness control will be retarded later.

In this manner, after the roughness control execution conditions are not established to temporarily stop the roughness control, when the roughness control conditions are established again, the roughness control is restarted by using the held roughness control variables. For this reason, the roughness control is early stabilized, and, therefore, the responsibility of the control is improved, and warming up of the engine 1 or an increase in temperature of the catalytic converter rhodium in the catalytic converter 27 can be considerably promoted while the change in torque is set within an allowable range. The emission performance and the fuel consumption performance can be improved.

If it is determined in step S32 described above that the engine warming-up flag $F_4$ is set at "1" (YES), the engine 1 has been set in a warming-up state, and the catalytic converter rhodium in the catalytic converter 27 may be sufficiently increased in temperature. For this reason, the roughness control is ended. However, when the roughness control is sharply ended (in the form of steps), the roughness control variable is suddenly eliminated. For this reason, the output torque may sharply change, and torque shock may occur. Therefore, in this case, the IG roughness control variables of the respective cylinders and the A/F roughness control variables of the respective cylinders are gradually decreased (steadily decreased) to be reset, so that the roughness control is relatively moderately ended. For this reason, torque shock in the end of the roughness control is prevented from occurring.

Figure 25:
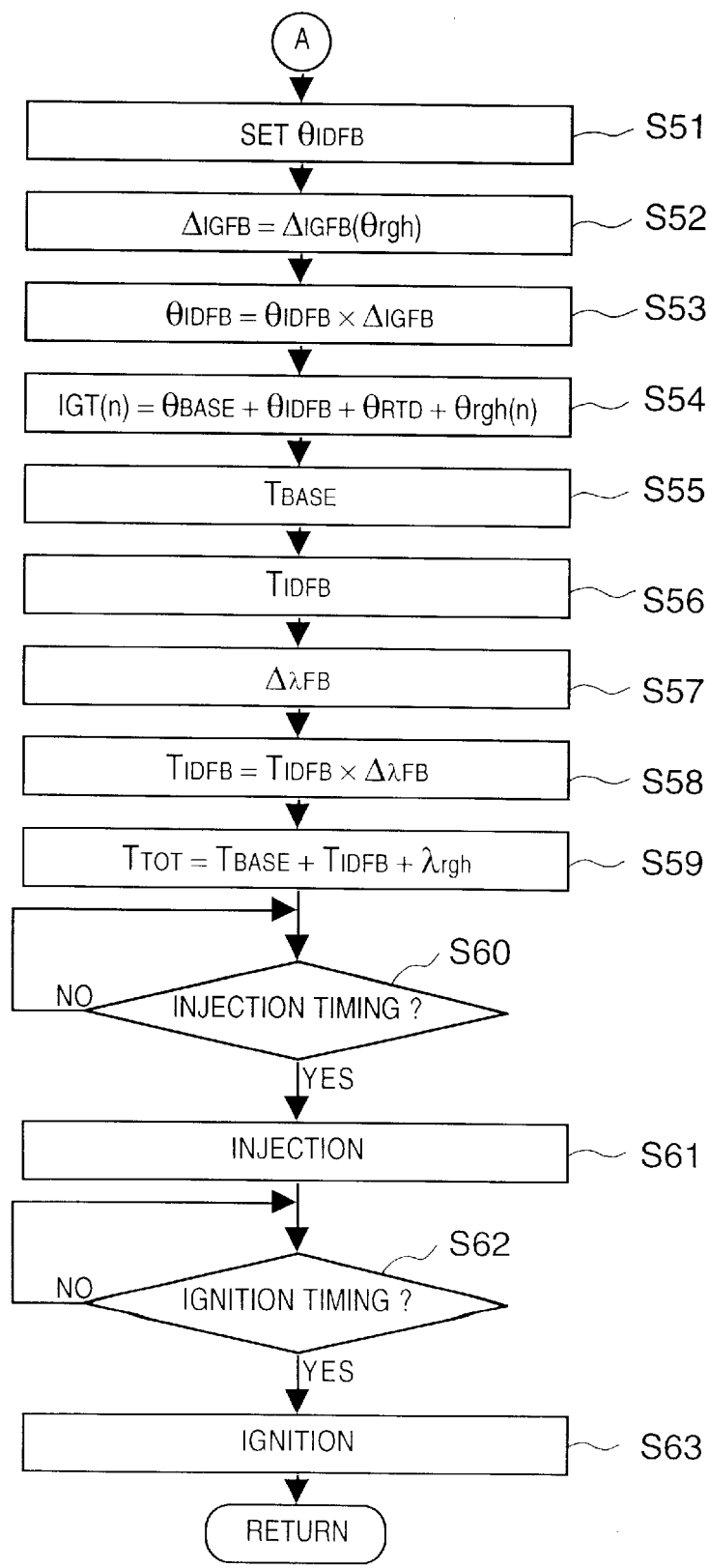
FIG. 25 is a flow chart showing a control procedure for applying determined various control variables to a control related to the first embodiment.

When the roughness control variable is determined with respect to an ignition timing or an air-by-fuel ratio by the control procedure FIG. 13 to FIG. 17, final determination of the ignition timing and determination of an amount of fuel injection are performed according to a control procedure in FIG. 25, and fuel injection and ignition are performed.

More specifically, in step S51, an ignition timing feedback control variable $\theta_{IDFB}$ is set according to a map having the characteristics shown in FIG. 5. In step S52, a feedback control gain $\Delta_{IGFB}$ depending on the value of the IG roughness control variable $\theta_{rgh}$ calculated according to the above control procedure is determined on the basis of a map having the characteristics shown in FIG. 6. In step S53, the ignition timing feedback control variable $\theta_{IDFB}$ is updated by the gain.

$$\theta_{IDFB} = \theta_{IDFB} \times \Delta_{IGFB} \qquad (11)$$

Figure 26:
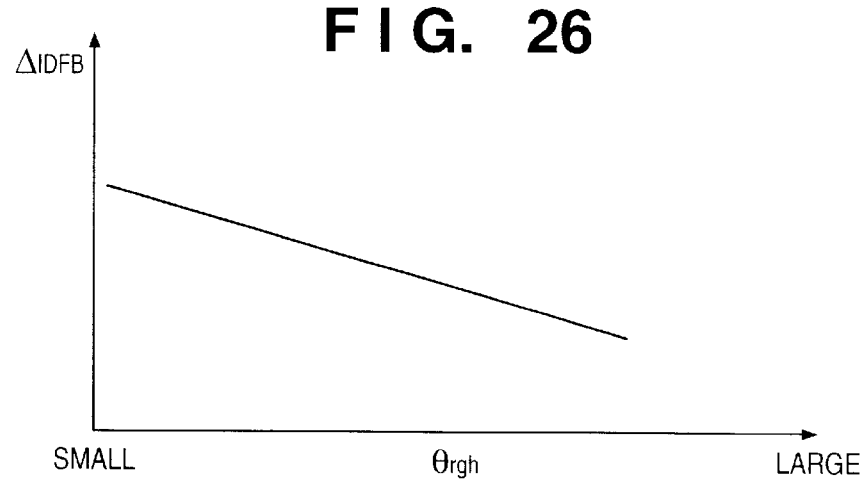
FIG. 26 is a graph for explaining determination of a control gain related to the first embodiment.

As described above, as shown in FIG. 26, the gain $\Delta_{IGFB}$ has a value which decreases as an amount of retarded angle of the ignition timing increases (output torque decreases). For this reason, since this gain has such1 a function that the ignition timing feedback control variable $\theta_{IDFB}$ is set to be a smaller value according to Equation (11), roughness is effectively eliminated.

In step S54, an ignition timing IGT is finally determined according to Equation (1).

Figure 27:
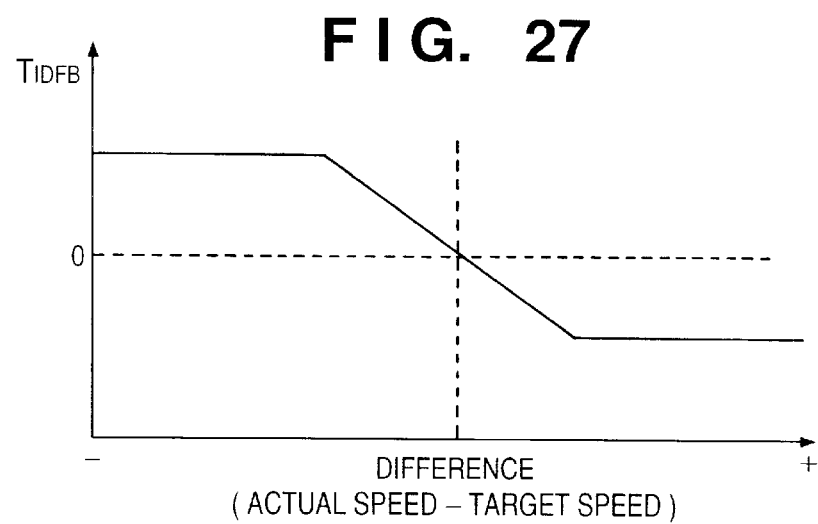
FIG. 27 is a graph for explaining determination of a control variable $T_{IDFB}$ related to the first embodiment.

In step S55, an amount of basic fuel injection $T_{BASE}$ is calculated on the basis of a predetermined map (not shown) with respect to an engine speed and an intake air filling rate. In step S56, an air-by-fuel ratio feedback control variable $T_{IDFB}$ is determined on the basis of a map having the characteristics in FIG. 27 according to the difference (abscissa in FIG. 27) between the engine speed and the target speed. In step S57, a control gain $\Delta_{\lambda FB}$ is determined on the basis of the characteristics in FIG. 28 depending on the value of the A/F roughness control variable $\lambda_{rgh}$. In step S58, the air-by-fuel ratio feedback control variable $T_{IDFB}$ is updated.

$$T_{IDFB}=T_{IDFB}\times\Delta_{\lambda FB} \quad (12)$$

Figure 28:
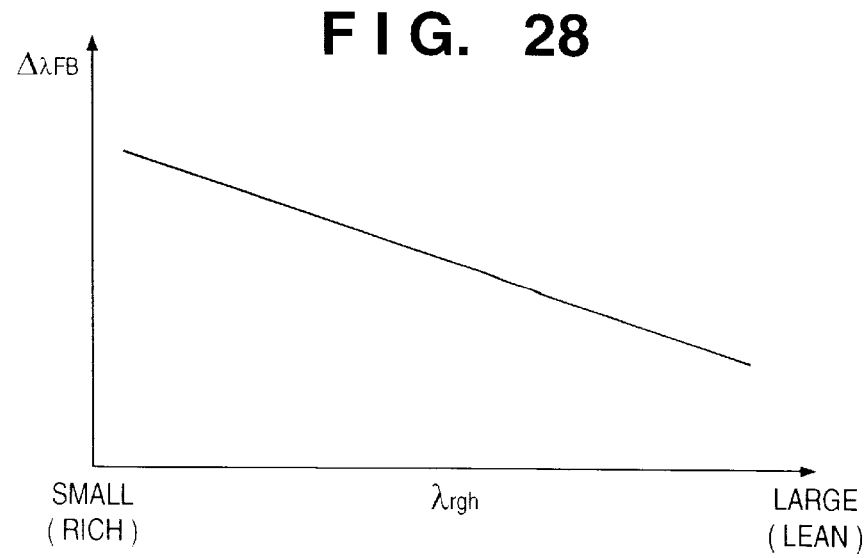
FIG. 28 is a graph for explaining determination of a control gain $\Delta_{\lambda FB}$ related to the second embodiment.

As described above, the gain $\Delta_{\lambda FB}$, as shown in FIG. 28, has a value which decreases as the A/F roughness control variable $\lambda_{rgh}$ increases (on a leaner side). For this reason, since this gain has such a function that the fuel injection control variable $T_{IDFB}$ is set to be a smaller value according to Equation (12) (large output torque is generated), roughness is effectively eliminated. In step S59, a total amount of fuel injection $T_{TOT}$ is determined according to the following equation:

$$T_{TOT}=T_{BASE}+T_{IDFB}+\lambda_{rgh}$$

As described above, the total amount of fuel injection $T_{TOT}$ and the ignition timing IGT are properly determined such that the roughness control and the speed feedback control are harmonized with each other. An injection timing is confirmed in step S60, and injection of the total amount of fuel injection $T_{TOT}$ is performed in step S61. It is confirmed in step S62 that the timing reaches the set timing, and ignition is performed in step S63.

<Second Embodiment>

In the first embodiment, in order to harmonize the air-by-fuel ratio feedback control and the ignition timing feedback control with each other, the gain is set depending on the value of the IG roughness control variable $\theta_{rgh}$ or the value of the A/F roughness control variable $\lambda_{rgh}$ (step S52 and step S57). However, roughness must be determined depending on the finally set value of the ignition timing or the amount of fuel injection. For example, even if the value of the IG roughness control variable $\theta_{rgh}$ has a small value, according to Equation (1), IGT may have a value which adversely affects a change in torque depending on the values of the other control variables ($\theta_{BASE}$ and $\theta_{IDFB}$) Therefore, according to the second embodiment, the gain is not set on the basis of the roughness control variables ($\theta_{rgh}$, $\lambda_{rgh}$, and the like), but is determined with reference to the basic ignition timing $\theta_{BASE}$, $\theta_{RTD}$, and the like, so that the final values of the control variables are largely considered in determination of the gain.

Figure 29:
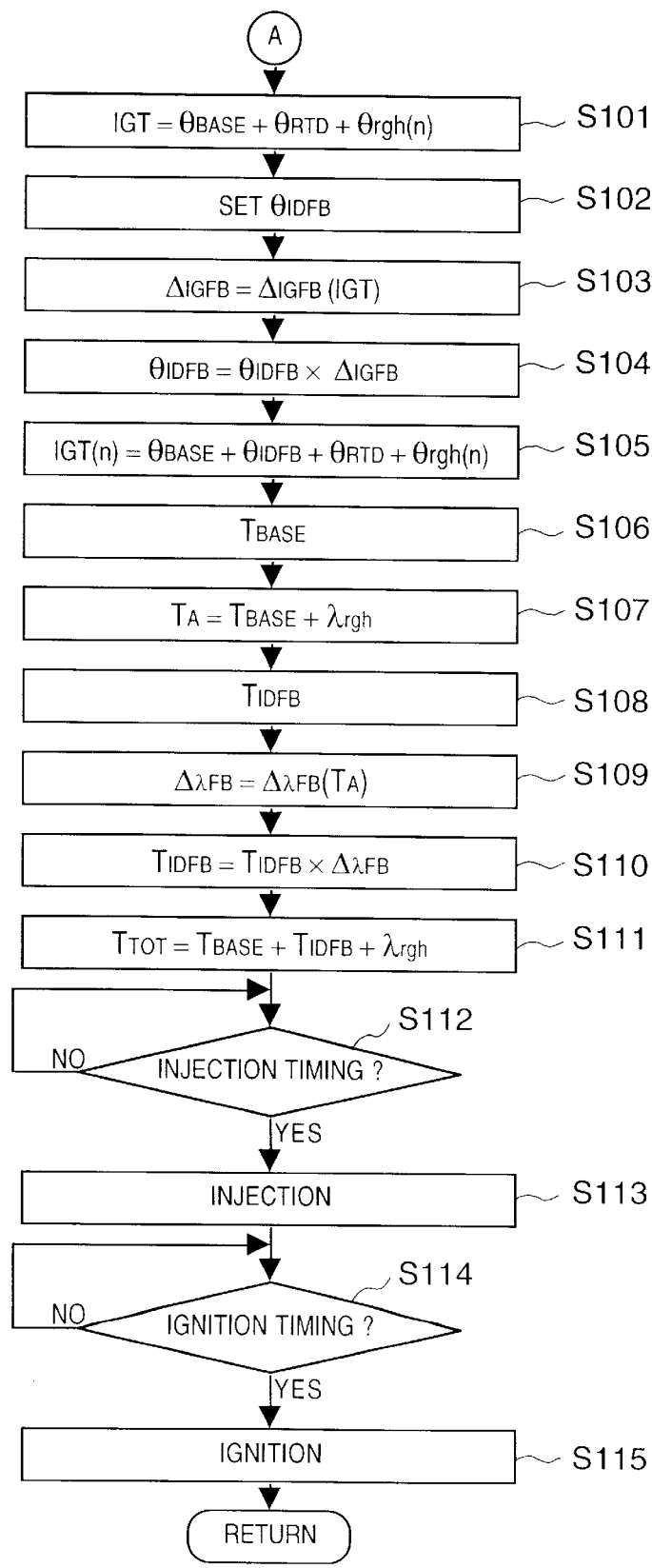
FIG. 29 is a flow chart showing a control procedure for applying determined various control variables to a control related to the second embodiment.

FIG. 29 shows a control procedure for the portion according to the second embodiment. More specifically, in the first embodiment, step S51 in FIG. 25 is executed after the control procedure in FIG. 17. However, in the second embodiment, step S101 in FIG. 29 is executed in place of the control procedure in FIG. 25.

That is, in step S101, according the following equation (13):

$$IGT(n)=\theta_{BASE}+\theta_{RTD}+\theta_{rgh}(n) \quad (13)$$

IGT(n) is calculate. Equation (13) is different from Equation (1) in that Equation (13) includes the term of ignition timing feedback control variable $\theta_{IDFB}$. The ignition timing feedback control variable $\theta_{IDFB}$ is calculated in the following step S102 rather than step S101. More specifically, like step S102, as in the first embodiment, according to the map having the characteristics in FIG. 5, the ignition timing feedback control variable $\theta_{IDFB}$ is set. In step S103, a feedback control gain $\Delta_{IGFB}$ depending on the value of IGT calculated according to the control procedure described above is determined on the basis of a map having the characteristics in FIG. 30. In step S104, the ignition timing feedback control variable $\theta_{IDFB}$ is updated by the gain.

$$\theta_{IDFB}=\theta_{IDFB}\times\Delta_{IGFB} \quad (14)$$

Figure 30:
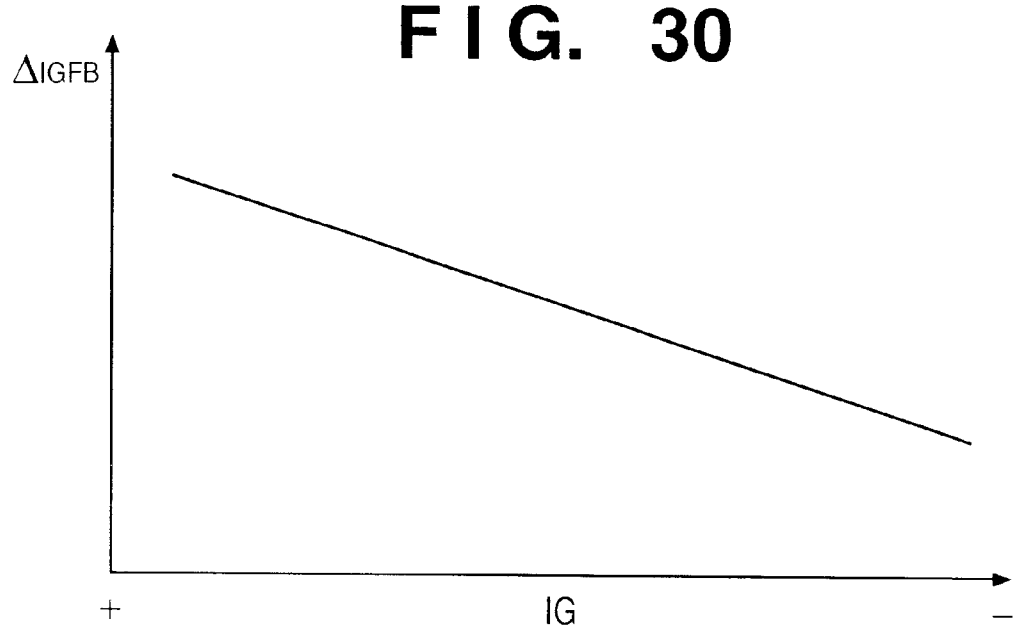
FIG. 30 is a graph for explaining determination of a control variable $\Delta_{IGFB}$ related to the second embodiment.

As described above, the gain $\Delta_{IGFB}$ includes a contribution of $\theta_{rgh}(n)$ as is apparent from Equation (13) and FIG. 30. Since the gain $\Delta_{IGFB}$ has a value which decreases as an amount of retarded angle of the ignition timing IGT increases (output torque decreases), the gain $\Delta_{IGFB}$ has such a function that the ignition timing feedback control variable $\theta_{IDFB}$ is set to be a smaller value according to Equation (13) (large output torque is generated). For this reason, roughness is effectively eliminated.

In step S105, the ignition timing IGT is finally determined according to Equation (1) while also considering $\theta_{IDFB}$ or the like determined in step S103.

Figure 31:
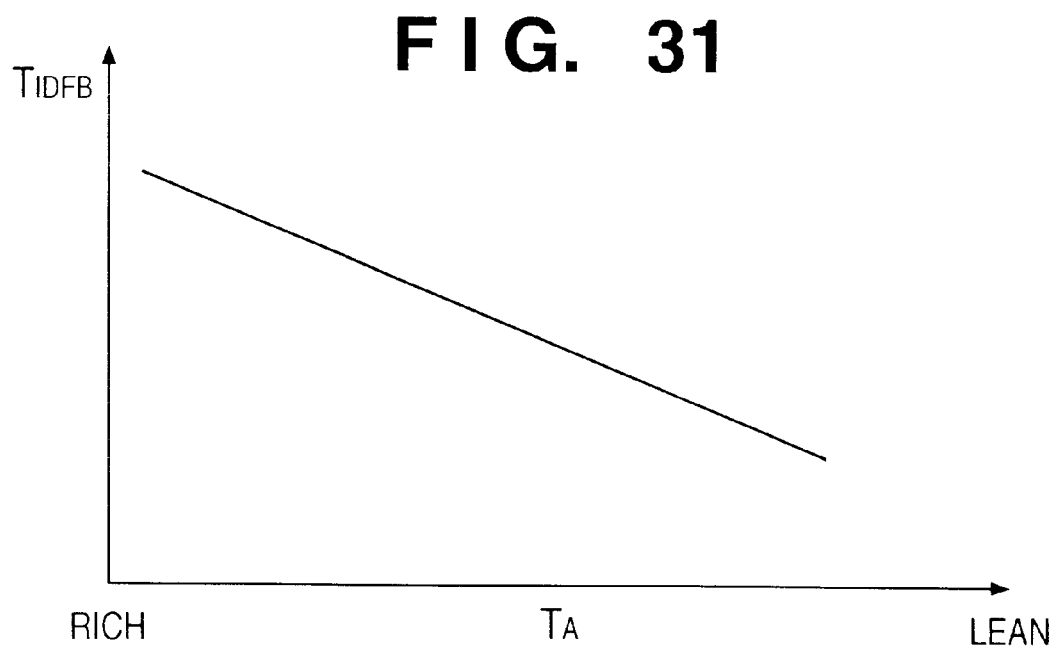
FIG. 31 is a graph for explaining determination of a control variable $T_{IDFB}$ related to the second embodiment.

In step S106, an amount of basic fuel injection $T_{BASE}$ is calculated on the basis of a predetermined map (not shown) with respect to an engine speed and an intake air filling rate. In step S107, according to Equation (15):

$$T_A=T_{BASE}+\lambda_{rgh} \quad (15)$$

a control variable $T_A$ is calculated. In this case, it is attended that the control variable $T_A$ includes the A/F roughness control variable $\lambda_{rgh}$. In step S108, as in the first embodiment, an air-by-fuel ratio feedback control variable $T_{IDFB}$ is determined on the basis of a map having the characteristics in FIG. 27 according to the difference (abscissa in FIG. 31) between the engine speed and the target speed so that the A/F becomes leaner as the difference is larger. In step S109, a control gain $\Delta_{\lambda FB}$ is determined on the basis of the characteristics in FIG. 31 depending on the control variable $T_A$ partially including the A/F roughness control variable $\lambda_{rgh}$ In step S110, the air-by-fuel ratio feedback control variable $T_{IDFB}$ is updated.

$$T_{IDFB}=T_{IDFB}\times\Delta_{\lambda FB} \quad (16)$$

As described above, the gain $T_{IDFB}$, as shown in FIG. 28, has a value which decreases as the control variable $T_A$ increases (on a leaner side). For this reason, since this gain has such a function that the fuel injection control variable $T_{IDFB}$ is set to be a smaller value according to Equation (16) (large output torque is generated), roughness is effectively eliminated. In step S110, as in the first embodiment, a total amount of fuel injection $T_{TOT}$ is determined according to the following equation:

$$T_{TOT}=T_{BASE}+T_{IDFB}+\lambda_{rgh} \quad (17)$$

As described above, the total amount of fuel injection $T_{TOT}$ and the ignition timing IGT are properly determined such that the roughness control and the speed feedback control are harmonized with each other. An injection timing is confirmed in step S112, and injection of the total amount of fuel injection $T_{TOT}$ is performed in step S113. It is confirmed in step S114 that the timing reaches the set timing, and ignition is performed in step S115.

<Modification>

In the first embodiment and the second embodiment, although the IG roughness control variables and the A/F roughness control variables of the respective cylinders are set and calculated, one roughness control variable $\theta'_{rgh}$, $\lambda_{rgh}$ may be set for all the cylinders. The roughness control variable for all the cylinders is set as follows. That is, an average value of roughness values $d\omega_f(i)$ calculated for the respective cylinders is calculated, $$\frac{\sum_i d\omega_f(i)}{\sum_i 1} \tag{18}$$

and the roughness control variable $\theta'_{rgh}$, $\lambda_{rgh}$ for all the cylinders is uniformly increased when the average value is large. With respect to calculation of $\theta'_{rgh}$, in step S17, step S21, and step S23, controls are changed such that $\theta'_{rgh}$ is changed on an advanced angle side, changed in a retarded angle side, or held. In addition, with respect to calculation of $\lambda'_{rgh}$, in step S27, step S28, and step S29, controls are changed such that $\lambda'_{rgh}$ is changed on a rich side, changed on a lean side, or held. In the steps in FIG. 16, the same processes as described above are performed.

As many apparently widely different embodiments of the present invention can be made without departing from the spirit and scope thereof, it is to be understood that the invention is not limited to the specific embodiments thereof except as defined in the appended claims.

What is claimed is:

1. An idle speed control device comprising:

engine speed detecting means for detecting an actual speed of an engine;

idle speed control means for determining a value of an ignition timing feedback control variable by a predetermined control gain in a feedback control on the basis of a difference between the actual speed and a target speed such that the actual speed of the engine is converged at the target speed in an idle drive state, and for determining an idle ignition timing by the ignition timing feedback control variable to execute an ignition timing feedback control;

ignition executing means for executing ignition on the basis of the idle ignition timing;

torque variation detecting means for detecting a torque variation caused by combustion of the engine; and correction means for correcting the predetermined control gain in the ignition timing feedback control to be decreased, as the torque variation is small.

2. A device according to claim 1, further comprising roughness control means for setting a roughness control value such that the ignition timing is on an advanced side and the torque variation is set within an allowable limit range when the torque variation is smaller, wherein the correction means corrects the predetermined control gain in the ignition timing feedback control to be decreased, as the roughness control value is large.

3. A device according to claim 2, further comprising ignition timing setting means for setting the basic ignition timing on the basis of a drive state, means for detecting an engine temperature, and retard correction value setting means for setting a retard correction value such that the ignition timing is on the retard side when the engine temperature is lower than a predetermined temperature, wherein the ignition executing means determines the ignition timing on the basis of the idle ignition timing, the basic ignition timing and the roughness control value, and executes the ignition on the basis of the ignition timing.

4. An idle speed control device comprising:

engine speed detection means for detecting an actual speed of an engine;

adjustment means for adjusting an air-by-fuel ratio in a combustion chamber of the engine;

idle speed control means for determining a value of an air-by-fuel ratio feedback control variable by a predetermined control gain in a feedback control on the basis of a difference between the actual speed and a target speed such that the actual speed of the engine is converged at the target speed in an idle drive state, and for feedback-controlling the air-by-fuel ratio by the air-by-fuel ratio feedback control variable;

detecting means for detecting a torque variation caused by combustion of the engine; and correction means for correcting the predetermined control gain in the air-by-fuel ratio feedback control to be decreased, as the torque variation is small.

5. A device according to claim 4, further comprising roughness control value setting means for setting a roughness control value such that the air-by-fuel ratio is on a lean side and the torque variation is set within an allowable limit range when the torque variation is small, wherein the correction means corrects a predetermined control gain in the air-by-fuel ratio feedback control to be decreased, as the roughness control value is large.

6. A device according to claim 5, further comprising ignition timing setting means for setting the basic air-by-fuel ratio on the basis of a drive state, wherein the adjustment means adjusts the air-by-fuel ratio in a combustion chamber of the engine on the basis of the basic air-by-fuel ratio, the roughness control value and the value of an air-by-fuel ratio feedback control variable.

7. An idle speed control device comprising:

an engine speed sensor for detecting an actual speed of an engine;

controller for inputting an output of the engine speed sensor;

an ignition plug for executing an ignition by signal received from the controller;

wherein the controller determines a value of an ignition timing feedback control variable by a predetermined control gain in a feedback control on the basis of a difference between the actual speed and a target speed such that the actual speed of the engine is converged at the target speed in an idle drive state, and determines an idle ignition timing by the ignition timing feedback control variable;

sets a basic ignition timing on the basis of a drive state;

sets a roughness control value such that the ignition timing is on a retard side when a torque variation, calculated by the actual speed, is small; and determines a first ignition timing on the basis of the idle ignition timing, the basic ignition timing and the roughness control value, and outputs ignition signal to the ignition plug on the basis of the first ignition timing;

and wherein the predetermined control gain in the ignition timing feedback control variable is corrected to be increased, as a second ignition timing, determined on the basis of the basic ignition timing and the roughness control value, is changed to a further retard side.

8. An idle speed control device comprising:

an engine speed sensor for detecting an actual speed of an engine;

controller for inputting an output of the engine speed sensor;

an injection valve for injecting fuel into a combustion chamber of the engine by signal received from the controller;

wherein the controller determines a value of an air-by-fuel ratio feedback control variable by a predetermined control gain in a feedback control on the basis of a difference between the actual speed and a target speed such that the actual speed of the engine is converged at the target speed in an idle drive state;

sets a basic air-by-fuel ratio on the basis of a drive state;

sets a roughness control value such that the air-by-fuel ratio is on a lean side when a torque variation, calculated by the actual speed and caused by combustion of the engine, is small; and determines a first air-by-fuel ratio on the basis of the air-by-fuel ratio feedback control variable, the basis air-by-fuel ratio and the roughness control value, and outputs injection signal to the injection valve by the first air-by-fuel ratio;

and wherein the predetermined control gain in the air-by-fuel ratio feedback control is corrected to be decreased, as the first air-by-fuel ratio is changed to a further lean side.

9. An idle speed control device comprising:

an engine speed sensor for detecting an actual speed of an engine;

controller for inputting an output of the engine speed sensor;

an ignition plug for executing an ignition by signal received from the controller;

wherein the controller determines a value of an ignition timing feedback control variable by a predetermined control gain in a feedback control on the basis of a difference between the actual speed and a target speed such that the actual speed of the engine is converged at the target speed in an idle drive state, and determines an idle ignition timing by the ignition timing feedback control variable; and outputs ignition signal to the ignition plug on the idle ignition timing;

and wherein the predetermined control gain in the ignition timing feedback control variable is corrected to be decreased, as a torque variation, calculated by the actual speed, is small.

10. An idle speed control device comprising:

an engine speed sensor for detecting an actual speed of an engine;

controller for inputting an output of the engine speed sensor;

an injection valve for injecting a fuel into a combustion chamber of the engine by signal received from the controller;

wherein the controller determines a value of an air-by-fuel ratio feedback control variable by a predetermined control gain in a feedback control on the basis of a difference between the actual speed and a target speed such that the actual speed of the engine is converged at the target speed in an idle drive state; and detects a torque variation caused by a combustion of the engine;

and wherein the predetermined control gain in the air-by-fuel ratio feedback control is corrected to be decreased, as the torque variation is small.

11. An idle speed control device comprising:

engine speed detection means for detecting an actual speed of an engine;

idle speed control means for determining a value of an ignition timing feedback control variable by a predetermined control gain in a feedback control on the basis of a difference between the actual speed and a target speed such that the actual speed of the engine is converged at the target speed in an idle drive state, and for determining an idle ignition timing by the ignition timing feedback control variable to execute an ignition timing feedback control;

ignition timing setting means for setting a basic ignition timing on the basis of a drive state;

torque variation detection means for detecting a torque variation caused by combustion of the engine;

roughness control value setting means for setting a roughness control value such that the ignition timing is on a retard side when the detected torque variation is small;

ignition executing means for determining a first ignition timing on the basis of the feedback control variable, the basic ignition timing and the roughness control value, and for executing ignition on the basis of the first ignition timing; and correction means for correcting the predetermined control gain in the ignition timing feedback control to be decreased, as a second ignition timing, determined on the basis of the basic ignition timing and the roughness control value, is changed to a further retard side.

12. A device according to claim 11, further comprising means for detecting an engine temperature and retard correction value setting means for setting a retard correction value such that the ignition timing is on the retard side when the engine temperature is lower than predetermined temperature, wherein the ignition executing means determines the first ignition timing on the basis of the retard correction value, the idle ignition timing, the basic ignition timing and the roughness control value, and wherein the correction means sets the second ignition timing on the basis of the retard correction value, the basic ignition timing and the roughness control value.

13. A device according to claim 11, wherein the roughness control value is set depending on a detected torque variation such that a torque variation caused by combustion of the engine is set within an allowable limit range.

14. A device according to claim 13, wherein the torque variation is measured on the basis of a change in engine speed.

15. A device according to claim 11, wherein is catalytic converter having an exhaust gas purification catalyzer is arranged in the engine arranged on an exhaust passage.

16. An idle speed control device comprising:

engine speed detection means for detecting an actual speed of an engine;

adjustment means for adjusting an air-by-fuel ratio in a combustion chamber of the engine;

idle speed control means for determining a value of an air-by-fuel ratio feedback control variable by a predetermined control gain in a feedback control on the basis of a difference between the actual speed and a target speed such that the actual speed of the engine is converged at the target speed in an idle drive state, and for adjusting the air-by-fuel ratio by the air-by-fuel ratio feedback control variable;

setting means for setting a basic air-by-fuel ratio on the basis of a drive state;

torque variation detecting means for detecting a torque variation caused by combustion of the engine;

roughness control value setting means for setting a roughness control value such that the air-by-fuel ratio is on a lean side when the torque variation is small;

air-by-fuel ratio control means for determining a first air-by-fuel ratio on the basis of the air-by-fuel ratio feedback control variable, the basic air-by-fuel ratio and the roughness control value, and for performing an air-by-fuel ratio control by the first air-by-fuel ratio; and correction means for correcting the predetermined control gain in the air-by-fuel ratio feedback control to be decreased, as the first air-by-fuel ratio is changed to a further lean side.

17. A device according to claim 16, wherein the roughness control value is set depending on the detected torque variation such that the torque variation caused by combustion of the engine is set within an allowable limit range.

18. A device according to claim 16, wherein the setting means sets the roughness control value to be a value at which the air-by-fuel ratio becomes leaner as a load in driving becomes low.

19. A device according to claim 16, wherein a torque variation is measured on the basis of a change in engine rotation.

20. A device according to claim 16, further comprising an injection valve for injecting a fuel, wherein the adjustment means adjusts a supply of fuel from the injection valve to adjust an air-by-fuel ratio.

21. An idle speed control device comprising:

first idle/roughness control means for feedback-controlling an idle speed of an engine by changing an ignition timing such that an engine speed is equal to a target idle speed in idling, and for calculating a roughness control variable, such that a torque change state caused by combustion is set within an allowable limit, depending on the torque change state to correct the ignition timing, thereby performing a roughness control for controlling roughness in a torque change;

second roughness control means for feedback-controlling an idle speed of an engine by changing an air-by-fuel ratio such that the engine speed is equal to the target idle speed in idling, and for calculating a roughness control variable depending on the amount of torque change state such that the torque change state caused by combustion is set within the allowable limit to correct the air-by-fuel ratio, thereby controlling roughness in a torque change; and selection means for selecting one of the first roughness control means and the second roughness control means to operate a selected one in idling.

22. A device according to claim 21, wherein the roughness control means corrects a feedback control variable calculated when the idle speed is feedback-controlled depending on a first roughness control variable generated in relation to the ignition timing; and the second roughness control means corrects a feedback control variable calculated when the idle speed is feedback-controlled depending on a second roughness control variable generated in relation to the air-by-fuel ratio.

23. A device according to claim 22, wherein the selection means compares the values of the first roughness control variable and the second roughness control variable with first and second predetermined threshold values, respectively, operates the second roughness control means when the first roughness control variable is larger than the first threshold value, and operates the first roughness control means when the second roughness control variable is larger than the second threshold value.

* * * * *